US008595229B2

(12) United States Patent
Karasudani et al.

(10) Patent No.: US 8,595,229 B2
(45) Date of Patent: Nov. 26, 2013

(54) SEARCH QUERY GENERATOR APPARATUS

(75) Inventors: Akira Karasudani, Kawasaki (JP); Takahiro Matsuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 706 days.

(21) Appl. No.: 11/564,412

(22) Filed: Nov. 29, 2006

(65) Prior Publication Data

US 2008/0027915 A1 Jan. 31, 2008

(30) Foreign Application Priority Data

Jul. 28, 2006 (JP) ................................. 2006-207075

(51) Int. Cl.
*G06F 7/00* (2006.01)
*G06F 17/30* (2006.01)

(52) U.S. Cl.
USPC .......................................... 707/736; 707/758

(58) Field of Classification Search
None
See application file for complete search history.

(56) References Cited

U.S. PATENT DOCUMENTS

| 5,619,709 | A | * | 4/1997 | Caid et al. ...................... 715/209 |
| 5,974,412 | A | * | 10/1999 | Hazlehurst et al. .................... 1/1 |
| 5,999,975 | A | * | 12/1999 | Kittaka et al. ................. 709/224 |
| 6,012,053 | A | | 1/2000 | Pant et al. |
| 6,065,001 | A | | 5/2000 | Ohkubo et al. |
| 6,119,117 | A | | 9/2000 | Yoda et al. |
| 6,134,532 | A | | 10/2000 | Lazarus et al. |
| 6,175,828 | B1 | * | 1/2001 | Kuromusha et al. ................... 1/1 |
| 6,778,979 | B2 | * | 8/2004 | Grefenstette et al. .................. 1/1 |
| 7,162,473 | B2 | * | 1/2007 | Dumais et al. ..................... 707/5 |
| 7,451,162 | B2 | | 11/2008 | Hess |
| 7,496,563 | B2 | * | 2/2009 | Newbold et al. ................... 707/3 |
| 7,665,024 | B1 | * | 2/2010 | Kondziela ...................... 715/745 |
| 7,707,284 | B2 | * | 4/2010 | Friedman et al. ............. 709/224 |
| 2001/0018698 | A1 | | 8/2001 | Uchino et al. |
| 2001/0049689 | A1 | | 12/2001 | Mentzer |
| 2002/0059227 | A1 | | 5/2002 | Narahara |
| 2002/0147754 | A1 | * | 10/2002 | Dempsey et al. ............. 708/671 |
| 2004/0030996 | A1 | | 2/2004 | Van Liempd et al. |
| 2004/0205723 | A1 | | 10/2004 | Juan et al. |
| 2004/0230645 | A1 | * | 11/2004 | Bodin et al. ................... 709/202 |

(Continued)

FOREIGN PATENT DOCUMENTS

| JP | 10-320419 | 12/1998 |
| JP | 11-39293 | 2/1999 |

(Continued)

OTHER PUBLICATIONS

D. Leake et al., "Selecting Task-Relevant Sources for Just-in-Time Retrieval," 1999, XP002432900, URL:http://ftp.cs.indiana.edu/pub/leake/leake/p-99-03.pdf.

(Continued)

*Primary Examiner* — Wilson Lee
*Assistant Examiner* — Jessica N Le
(74) *Attorney, Agent, or Firm* — Staas & Halsey LLP

(57) ABSTRACT

A search query generator apparatus includes a computing device including a processor and an information manipulation database. The computing device includes an information manipulation monitor unit to detect information manipulations that a user has performed with a computer by monitoring information manipulations in the computer performed by the user and a task detection unit to detect a task of the user by analyzing data relating to the information manipulations accumulated in the information manipulation database, and wherein the information manipulation database accumulates data relating to information manipulations detected by the information manipulation monitor unit.

16 Claims, 22 Drawing Sheets

(56) References Cited

U.S. PATENT DOCUMENTS

| | | | |
|---|---|---|---|
| 2004/0267730 A1* | 12/2004 | Dumais et al. | ............ 707/3 |
| 2007/0112792 A1 | 5/2007 | Majumder | |
| 2007/0136235 A1 | 6/2007 | Hess | |
| 2007/0299631 A1 | 12/2007 | Macbeth et al. | |
| 2008/0071761 A1 | 3/2008 | Singh et al. | |

FOREIGN PATENT DOCUMENTS

| | | |
|---|---|---|
| JP | 11-143912 | 6/1999 |
| JP | 11-250080 | 9/1999 |
| JP | 11-265378 | 9/1999 |
| JP | 2000-172696 | 6/2000 |
| JP | 2002-32388 | 1/2002 |
| JP | 3547069 | 4/2004 |
| JP | 2005-309727 | 11/2005 |
| WO | 02/37839 | 5/2002 |

OTHER PUBLICATIONS

M. H. Smith et al., "FuzzyBase: An Information—Intelligent Retrieval System," Systems, Man, and Cybernetics, 1998, IEEE International Conference, vol. 3, pp. 2797-2802, XP010310661.

G. Xiangzhu et al., "A Dynamic information Retrieval System for the Web," Proceedings of the 27$^{th}$ Annual International Computer Software and Applications Conference, COMPSAC 2003, vol. Conf. 26, pp. 670-675, XP010669686.

M. Bamshad et al., "Automatic Personalization Based on Web Usage Mining," 2000, pp. 142-151, XP002432901, URL:http://portal.acm.org.

European Office Action mailed Aug. 17, 2009 and issued in corresponding European Patent Application 06 255 990.1.

S. Stumpf et al., "Predicting User Tasks: I Know What You're Doing!", AAAI Workshop—Tech. Report 2005, vol. WS-05-04, pp. 14-19.

F. Wiesman et al., "Information retrieval: an overview of system characteristics", International Journal of Medical Informatics, vol. 47, Nos. 1-2, Elsevier Scientific Publishers, Nov. 1997, pp. 5-26.

R. Baeza-Yates et al., Modern Information Retrieval, ACM Press/ Longman Limited,1999, pp. 18-71.

J. Canny, "GaP: A Factor Model for Discrete Data", Proceedings of Twenty-Seventh Annual International ACM SIGIR Conference on Research and Development in Information Retrieval, 2004, pp. 122-129.

L. Matthijssen, "A Task-Based Interface to Legal Databases", Artificial Intelligence and Law, Mar. 1998, pp. 81-103.

D. B. Leake et al., "Integrating Information Resources: A Case Study of Engineering Design Support", LNCS 1650: Case-Based Reasoning Research and Development, Jan. 1999, Springer-Verlag, 1999, pp. 482-496.

Anton N. Dragunov et al., TaskTracer: A Desktop Environment to Support Multi-tasking Knowledge Workers, Jan. 2005, pp. 75-82.

Jay Budzik et al., Selecting Task-Relevant Sources for Just-in-Time Retrieval, pp. 1-3.

Office Action mailed Jul. 2, 2009; U.S. Appl. No. 11/742,077.

European Communication dated Aug. 14, 2008, issued in the corresponding European Patent Application No. 07106582.5-2201.

U.S. Appl. No. 11/742,077, filed Apr. 30, 2007, Akira Karasudani, Fujitsu Limited.

U.S. Office Action mailed Jan. 25, 2010 in related U.S. Appl. No. 11/742,077.

U.S. Office Action mailed Jul. 20, 2010 in related U.S. Appl. No. 11/742,077.

U.S. Office Action mailed Feb. 7, 2011 in related U.S. Appl. No. 11/742,077.

Please note that the references (AG) and (AH) listed on the attached PTO-1449 were cited in a Japanese Office Action issued Feb. 22, 2011 in corresponding Japanese Patent Application 2006-247451.

Please note that JP 11-039293 and JP 11-143912 were also cited in the Japanese Office Action issued Feb. 22, 2011 in corresponding Japanese Patent Application 2006-247451 and was submitted in a previous Information Disclosure Statement filed Jan. 6, 2010.

Japanese Office Action issued Feb. 22, 2011 in corresponding Japanese Patent Application 2006-247451.

Please note that JP 11-039293 and JP 11-143912 were also cited in the Japanese Office Action issued Feb. 22, 2011 in corresponding Japanese Patent Application 2006-247451 and were submitted in a previous Information Disclosure Statement filed May 1, 2007.

Japanese Office Action issued Apr. 19, 2011 in corresponding Japanese Patent Application 2006-207075.

U.S. Office Action mailed Jun. 21, 2011 in corresponding U.S. Appl. No. 11/742,077 (All refs cited in the Office Action were previously filed in an IDS in the above-identified application).

U.S. Office Action mailed March 27, 2013 in related U.S. Appl. No. 11/742,077.

U.S. Office Action mailed Jan. 12, 2012 issued in related U.S. Appl. No. 11/742,077.

* cited by examiner

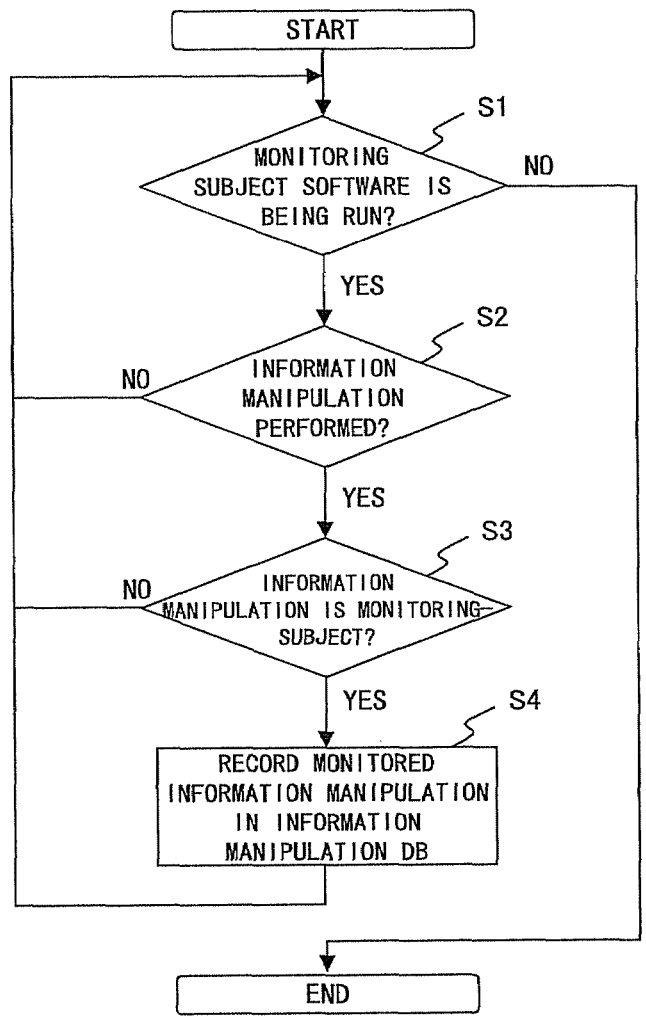
F I G. 4

| MANIPULATION ID | DATE | TIME | MANIPULATION | MANIPULATION SUBJECT | MANIPULATION DETAIL | USER NAME | PC NAME |
|---|---|---|---|---|---|---|---|
| 0001 | Sep/13/06 | 10:00 AM | OPEN | FILE A | — | Ben | PC1 |
| 0002 | Sep/13/06 | 10:05 AM | OPEN | FILE B | — | Ben | PC1 |
| 0003 | Sep/13/06 | 10:10 AM | DATA COPY | FILE A | COPY : FILE B COPIED CONTENTS : AAA | Ben | PC1 |
| 0004 | Sep/13/06 | 10:13 AM | SAVE | FILE A | — | Ben | PC1 |
| 0005 | Sep/13/06 | 10:13 AM | PRINT | FILE A | — | Ben | PC1 |
| 0006 | Sep/13/06 | 10:18 AM | E-MAIL | FILE A | RECEIVER : Paul | Ben | PC1 |
| 0007 | Sep/13/06 | 10:19 AM | CLOSE | FILE A | — | Ben | PC1 |
| 0008 | Sep/13/06 | 10:20 AM | CLOSE | FILE B | — | Ben | PC1 |
| 0009 | Sep/13/06 | 10:25 AM | OPEN | EMAIL A | SENDER : Norman | Ben | PC1 |
| 0010 | Sep/13/06 | 10:45 AM | REPLY | EMAIL B | REPLY TO : Norman | Ben | PC1 |
| 0011 | Sep/13/06 | 10:50 AM | CLOSE | EMAIL A | — | Ben | PC1 |
| 0012 | Sep/13/06 | 11:00 AM | OPEN | FILE A | — | Paul | PC3 |
| | ... | ... | ... | ... | ... | ... | ... |
| | ... | ... | ... | ... | ... | ... | ... |

F I G. 5

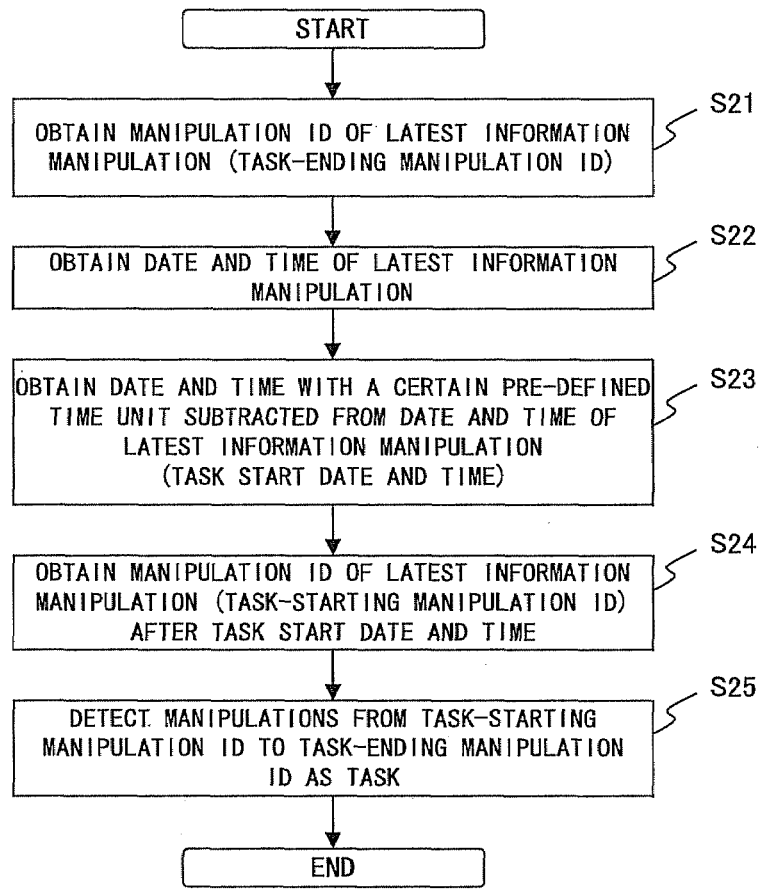
F I G. 7

| MANIPULATION ID | DATE | TIME | MANIPULATION | MANIPULATION SUBJECT | MANIPULATION DETAIL | USER NAME | PC NAME |
|---|---|---|---|---|---|---|---|
| 0001 | Sep/13/06 | 10:00 AM | OPEN | FILE A | — | Ben | PC1 |
| 0002 | Sep/13/06 | 10:05 AM | OPEN | FILE B | — | Ben | PC1 |
| 0003 | Sep/13/06 | 10:10 AM | DATA COPY | FILE A | COPY SOURCE : FILE B COPIED CONTENTS : AAA | Ben | PC1 |
| 0004 | Sep/13/06 | 10:13 AM | SAVE | FILE A | — | Ben | PC1 |
| 0005 | Sep/13/06 | 10:13 AM | PRINT | FILE A | — | Ben | PC1 |
| 0006 | Sep/13/06 | 10:18 AM | E-MAIL | FILE A | RECEIVER : Paul | Ben | PC1 |
| 0007 | Sep/13/06 | 10:19 AM | CLOSE | FILE A | — | Ben | PC1 |
| 0008 | Sep/13/06 | 10:20 AM | CLOSE | FILE B | — | Ben | PC1 |
| 0009 | Sep/13/06 | 10:25 AM | OPEN | EMAIL A | SENDER : Norman | Ben | PC1 |
| 0010 | Sep/13/06 | 10:45 AM | REPLY | EMAIL B | REPLY TO : Norman | Ben | PC1 |
| 0011 | Sep/13/06 | 10:50 AM | CLOSE | EMAIL A | — | Ben | PC1 |
| 0012 | Sep/13/06 | 11:00 AM | OPEN | FILE A | — | Ben | PC1 |

F I G. 8

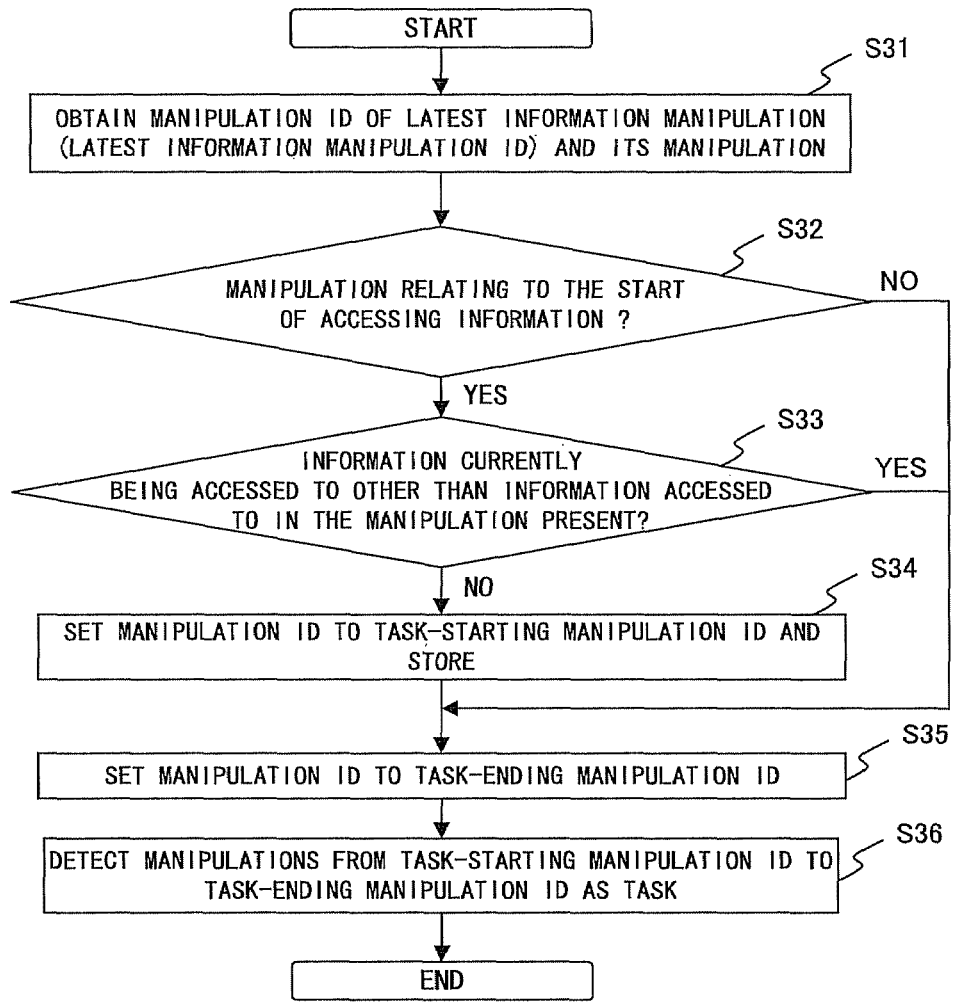
F I G. 9

| MANIPULATION ID | DATE | TIME | MANIPULATION | MANIPULATION SUBJECT | MANIPULATION DETAIL | USER NAME | PC NAME |
|---|---|---|---|---|---|---|---|
| 0001 | Sep/13/06 | 9:45 AM | SEND | EMAIL A | RECEIVER : Paul | Ben | PC1 |
| 0002 | Sep/13/06 | 10:00 AM | OPEN | FILE A | — | Ben | PC1 |
| 0003 | Sep/13/06 | 10:05 AM | OPEN | FILE B | — | Ben | PC1 |
| 0004 | Sep/13/06 | 10:10 AM | DATA COPY | FILE A | COPY SOURCE : FILE B COPIED CONTENTS : AAA | Ben | PC1 |
| 0005 | Sep/13/06 | 10:13 AM | SAVE | FILE A | — | Ben | PC1 |
| 0006 | Sep/13/06 | 10:13 AM | PRINT | FILE A | — | Ben | PC1 |
| 0007 | Sep/13/06 | 10:18 AM | E-MAIL | FILE A | RECEIVER : Paul | Ben | PC1 |
| 0008 | Sep/13/06 | 10:19 AM | CLOSE | FILE A | — | Ben | PC1 |
| 0009 | Sep/13/06 | 10:20 AM | CLOSE | FILE B | — | Ben | PC1 |

FIG. 10

| MANIPULATION ID | DATE | TIME | MANIPULATION | MANIPULATION SUBJECT | MANIPULATION DETAIL | USER NAME | PC NAME |
|---|---|---|---|---|---|---|---|
| 0001 | Sep/13/06 | 10:00 AM | OPEN | FILE A | – | Ben | PC1 |
| 0002 | Sep/13/06 | 10:05 AM | OPEN | FILE B | – | Ben | PC1 |
| 0003 | Sep/13/06 | 10:10 AM | DATA COPY | FILE A | COPY SOURCE : FILE B  COPIED CONTENTS : AAA | Ben | PC1 |
| 0004 | Sep/13/06 | 10:13 AM | SAVE | FILE A | – | Ben | PC1 |
| 0005 | Sep/13/06 | 10:13 AM | PRINT | FILE A | – | Ben | PC1 |
| 0006 | Sep/13/06 | 10:18 AM | E-MAIL | FILE A | RECEIVER : Paul | Ben | PC1 |
| 0007 | Sep/13/06 | 10:19 AM | CLOSE | FILE A | – | Ben | PC1 |
| 0008 | Sep/13/06 | 10:20 AM | CLOSE | FILE B | – | Ben | PC1 |
| 0009 | Sep/13/06 | 10:25 AM | OPEN | EMAIL A | SENDER : Norman | Ben | PC1 |

FIG. 12A

| MANIPULATION SUBJECT |
|---|
| FILE A |
| FILE B |

FIG. 12B

| MANIPULATION SUBJECT |
|---|
| EMAIL A |

FIG. 12C

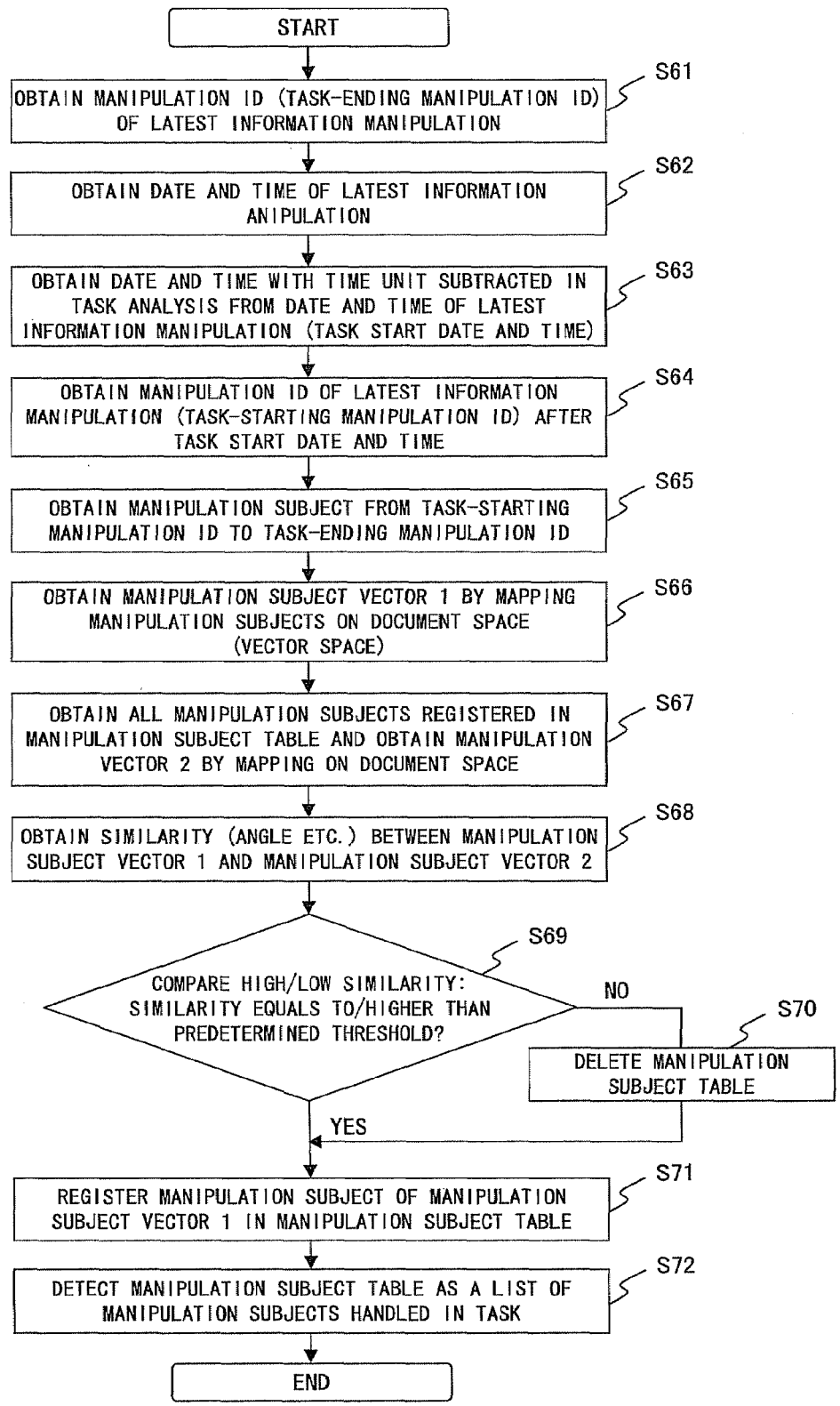
F I G. 1 4

| MANIPULATION ID | DATE | TIME | MANIPULATION | MANIPULATION SUBJECT | MANIPULATION DETAIL | USER NAME | PC NAME |
|---|---|---|---|---|---|---|---|
| 0001 | Sep/13/06 | 10:00 AM | OPEN | FILE A | – | Ben | PC1 |
| 0002 | Sep/13/06 | 10:05 AM | OPEN | FILE B | – | Ben | PC1 |
| 0003 | Sep/13/06 | 10:10 AM | DATA COPY | FILE A | COPY SOURCE : FILE B COPIED CONTENTS : AAA | Ben | PC1 |
| 0004 | Sep/13/06 | 10:13 AM | SAVE | FILE A | – | Ben | PC1 |
| 0005 | Sep/13/06 | 10:13 AM | PRINT | FILE A | – | Ben | PC1 |
| 0006 | Sep/13/06 | 10:18 AM | E-MAIL | FILE A | RECEIVER : Paul | Ben | PC1 |
| 0007 | Sep/13/06 | 10:19 AM | CLOSE | FILE A | – | Ben | PC1 |
| 0008 | Sep/13/06 | 10:20 AM | CLOSE | FILE B | – | Ben | PC1 |
| 0009 | Sep/13/06 | 10:25 AM | OPEN | EMAIL A | SENDER : Norman | Ben | PC1 |

F I G. 15A

| MANIPULATION SUBJECT |
|---|
| FILE A |
| FILE B |

F I G. 15B

| MANIPULATION SUBJECT |
|---|
| FILE A |
| FILE B |
| EMAIL A |

| MANIPULATION ID | DATE | TIME | MANIPULATION | MANIPULATION SUBJECT | MANIPULATION DETAIL | USER NAME | PC NAME |
|---|---|---|---|---|---|---|---|
| 0001 | Sep/13/06 | 10:00 AM | OPEN | FILE A | - | Ben | PC1 |
| 0002 | Sep/13/06 | 10:05 AM | OPEN | FILE B | - | Ben | PC1 |
| 0003 | Sep/13/06 | 10:10 AM | DATA COPY | FILE A | COPY SOURCE : FILE B COPIED CONTENTS : AAA | Ben | PC1 |
| 0004 | Sep/13/06 | 10:13 AM | SAVE | FILE A | - | Ben | PC1 |
| 0005 | Sep/13/06 | 10:13 AM | PRINT | FILE A | - | Ben | PC1 |
| 0006 | Sep/13/06 | 10:18 AM | E-MAIL | FILE A | RECEIVER : Paul | Ben | PC1 |
| 0007 | Sep/13/06 | 10:19 AM | CLOSE | FILE A | - | Ben | PC1 |
| 0008 | Sep/13/06 | 10:20 AM | CLOSE | FILE B | - | Ben | PC1 |
| 0009 | Sep/13/06 | 10:25 AM | OPEN | EMAIL A | SENDER : Norman | Ben | PC1 |

FIG. 17B

| MANIPULATION SUBJECT |
|---|
| FILE A |
| FILE B |

FIG. 17C

| MANIPULATION SUBJECT |
|---|
| FILE A |
| FILE B |
| EMAIL A |

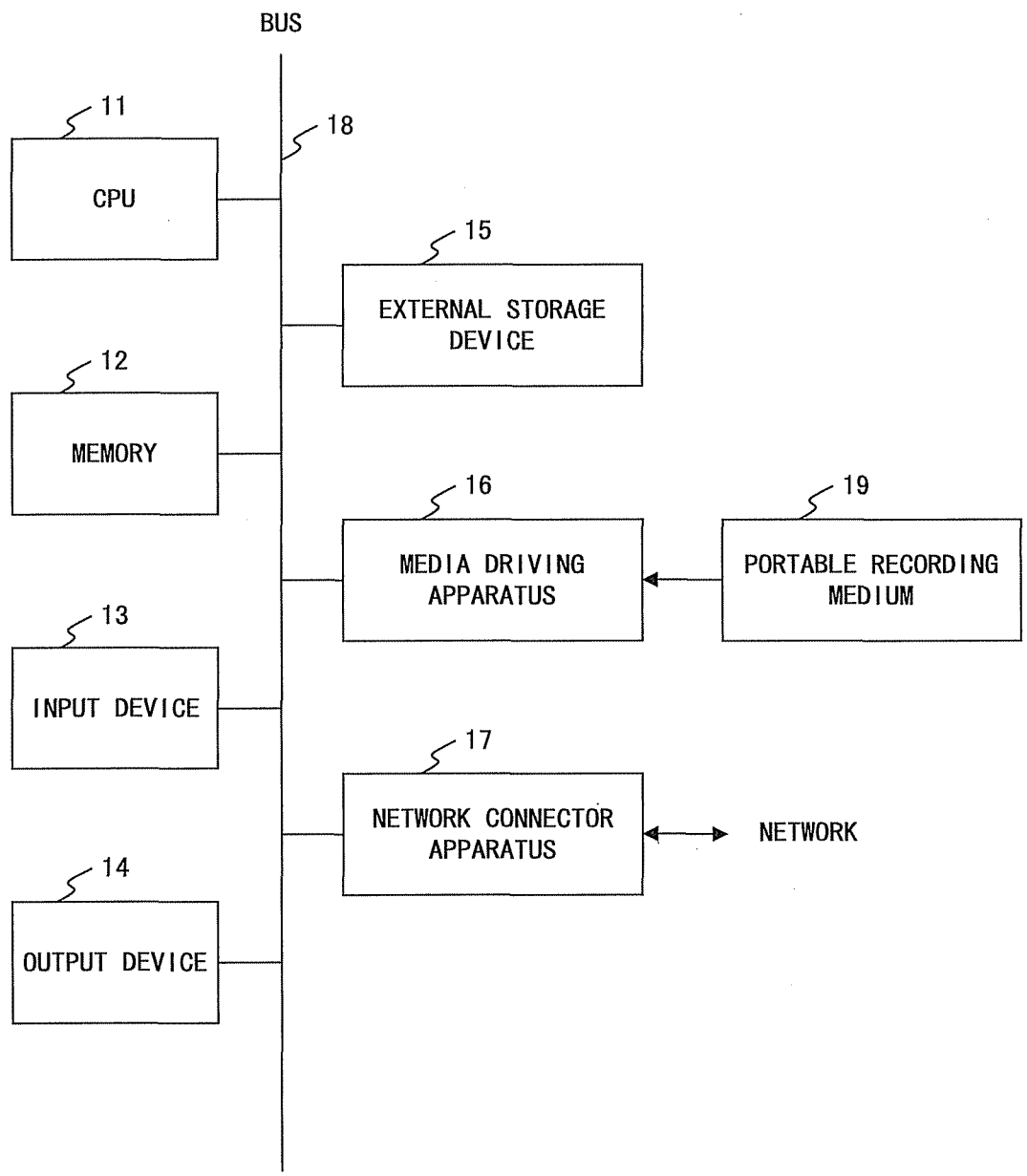
F I G. 2 1

SEARCH QUERY GENERATOR APPARATUS

BACKGROUND OF THE INVENTION

1. Field of the Invention

The present invention relates to a technology for generating search condition expressions of a system for searching information (files and emails etc.) by a computer or a system that makes a computer search information.

2. Description of the Related Art

There are two representative methods for generating search condition expressions (hereinafter referred to as "search queries" or simply "queries") when searching for information.

Method 1: Query Generation by a User

In method 1, a user generates queries in consideration of keywords and attributes (hereinafter referred to as "metadata") relating to the information in a search. The user then inputs the generated queries into the search system and the system searches for the information. This method is commonly used in web search services such as Google™ and MSN Search (MSN is TM) and in file search software such as Google Desktop Search and Windows Desktop Search.

Method 2: Automatic Query Generation

In method 2, a computer rather than a user generates queries automatically by extracting keywords and attributes. The keywords and attributes designated in queries are extracted by the computer and the computer automatically analyzes the information that the user is currently processing. The information currently being processed can be a document or a web page that the user is currently creating or browsing. The computer presents the generated queries to the user or automatically searches for the information (related information) relating to the information currently being processed by using the query.

FIG. 1 is a diagram showing an overview of an existing apparatus for automatically generating queries. As shown in FIG. 1, in the existing apparatus, a computer (PC) 101 on which a user performs a task comprises an information manipulation monitor unit 102, an information detection unit 103, a search feature information extraction unit 104, and a query generation unit 105. The information manipulation monitor unit 102 monitors information manipulations performed in the computer 101 by the user and detects the information that the user is handling. Note that, in FIG. 1, an information record unit 106 for storing information that users can manipulate is shown. The information detection unit 103 detects information currently being processed by the user on the basis of the detection result of the information manipulation monitor unit 102. The search feature information extraction unit 104 extracts search feature information from the information detected by the information detection unit 103. The query generation unit 105 generates queries by combining the search feature information extracted by the search feature information extraction unit 104. Using the generated queries, an information search is executed.

Additionally, Japanese Patent Application Publication No. 11-265378 describes a method for automatically extracting, from a document that a user is working on, information representing the features of the document (feature information) and for searching for related documents on the basis of this feature information. The feature information includes keywords in the document and the attributes of the document. Similarly, the Blinx search system is also a system for generating queries by extracting keywords from the context of the information that a user is currently working on (documents, emails, Web pages etc.) and for executing the search. Both of these methods generate queries relating to the information that a user is currently working on.

Japanese Patent Publication No. 3547069 describes a method for extracting a user's information need from the search condition expression that the user input. A computer compiles the user-input search condition expressions at a regular interval, and obtains the user's information need by calculating the frequency of the appearance of the search conditions etc.

In the conventional automatic query generation technology, a computer generates queries only from an information source (a document, a Web page etc.) being currently processed by a user. In this case, there is only one information source for generating the queries (a document being referred, an email being referred to or an email being composed etc.). If this information source includes all search conditions (keywords or attributions) corresponding to a user's information need, the computer can generate appropriate queries. If the information source does not contain sufficient information to satisfy a user's information need, it is probable that the computer will not be able to generate queries sufficient for searching the related information. If the search is conducted using the queries generated from insufficient information, the search result would include much information unrelated to the information need of the user (noise information).

When the user actually works on the task, the user often carries out the task with reference to various pieces of information related to the task. For example, when the user creates a document, the user might work on the task with reference to other documents, to Web pages, and to emails related to the task. In such a case, it is highly probable that the feature information of the task is present and is scattered in the plurality of information. However, since the conventional art focuses only on the information being processed by the user, the feature information included in the other information source in the task cannot be extracted. As a result, it is probable that the computer will not be able to collect sufficient feature information on the task, and the computer will not be able to generate appropriate queries to accurately search for the task-related information.

In addition, at the start of creating new information (documents or emails etc.) in the task, the information volume included in the information is small at first. Since the conventional art focuses on the information being processed, the queries for searching for the related information must be generated from the small volume of the information. Even if the other information has been used as reference information in the task or data is copied from other information, the information contained in such an information source cannot be used for query generation. Therefore, queries that sufficiently reflect the information need of the user cannot be generated because of the small information volume.

SUMMARY OF THE INVENTION

In view of the above circumstances, it is an object of the present invention to provide a search query generator apparatus that can automatically generate a query from all of the information that a user handles in a task (including information that the user referred to or copied data while performing the task in addition to information being processed by the user), a search query generation method, and a recording medium for recording a search query generation program.

In order to achieve the above object, the search query generator apparatus relating to the first aspect of the present invention comprises an information manipulation monitor unit detecting information manipulations that a user has performed with a computer by monitoring information manipulations in the computer performed by the user, an information manipulation database accumulating data relating to information manipulations detected by the information manipulation monitor unit, and a task detection unit detecting task of the user by analyzing data relating to the information manipulations accumulated in the information manipulation database.

According to such an apparatus, a task that a user performs in a computer can be detected.

The search query generator apparatus relating to the second aspect of the present invention further comprises, in addition to that comprised in the first aspect of the present invention, a task feature information extraction unit identifying a set of information handled in the task from the user task detected by the task detection unit and extracting task feature information characterizing the task from the set of information.

According to such an apparatus, it is possible to identify a set of information that a user handled in the detected task and to extract task feature information from the set of information.

The search query generation apparatus relating to the third aspect of the present invention further comprises, in addition to that comprised in the second aspect of the present invention, a query generator unit generating a search query by combining task feature information extracted by the task feature information extraction unit.

According to such an apparatus, it is possible to generate a search query for searching information relating to the task that a user has performed in a computer by using the task feature information of the extracted task.

It should be noted that the present invention is not limited to the search query generator apparatus, but can be constructed as a search query generation method and a computer-readable recording medium that records a search query generation program.

BRIEF DESCRIPTION OF THE DRAWINGS

FIG. 4 is a flowchart showing the operations of the information manipulation monitor unit;

FIG. 5 is a diagram showing an example of data relating to the information manipulations recorded in the information manipulation DB by the operations of the information manipulation monitor unit;

FIG. 7 is a flowchart of a case in which the task analysis employs the method for detecting a task by extracting information manipulations at certain time intervals;

FIG. 8 is a diagram showing an example of data relating to the information manipulations registered in the information manipulation DB;

FIG. 9 is a flowchart of a case in which the task analysis employs the method for detecting a task by determining the flow of information manipulations;

FIG. 10 is a diagram showing an example of data relating to information manipulations registered in the information manipulation DB;

FIG. 12A is a diagram showing an example of data relating to the information manipulations registered in the information manipulation DB;

FIG. 12B is a diagram showing the contents of the manipulation subject table before the manipulation ID (0009) is registered in the information manipulating DB;

FIG. 12C is a diagram showing the contents of the manipulation subject table after the manipulation ID (0009) is registered in the information manipulating DB;

FIG. 14 is a flowchart of a case in which the task analysis employs the method for detecting a task after extracting information manipulations at certain time intervals by using the similarity of the information handled by a user during the intervals;

FIG. 15A is a diagram showing an example of data relating to the information manipulations registered in the information manipulation DB;

FIG. 15B is a diagram showing the contents of the manipulation subject table before the manipulation ID (0009) is registered in the information manipulation DB;

FIG. 15C is a diagram showing the contents of the manipulation subject table after the manipulation ID (0009) is registered in the information manipulation DB;

FIG. 17A is a diagram showing an example of data relating to the information manipulations registered in the information manipulation DB;

FIG. 17B is a diagram showing the contents of the manipulation subject table before the manipulation ID (0009) is registered in the information manipulation DB;

FIG. 17C is a diagram showing the contents of the manipulation subject table after the manipulation ID (0009) is registered in the information manipulation DB;

FIG. 21 is a diagram of the configuration of the information processor apparatus.

DESCRIPTION OF THE PREFERRED EMBODIMENTS

In the following description, the embodiments of the present invention are set forth with reference to the drawings.

Figure 2:
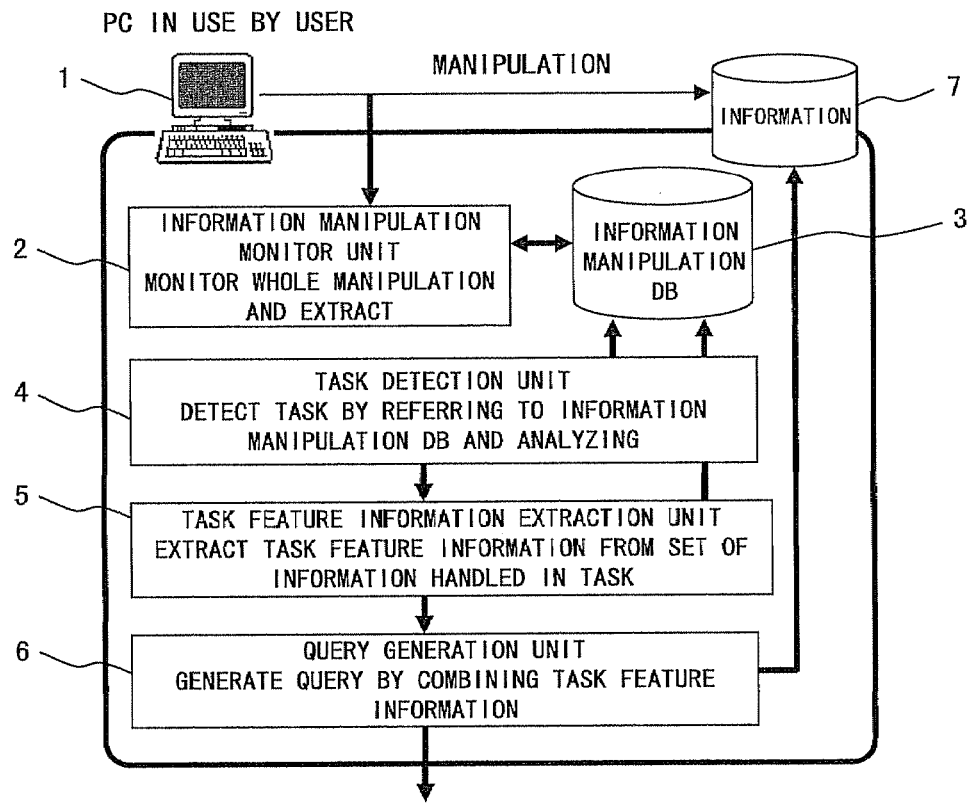
FIG. 2 is a diagram showing an overview of the search query generator apparatus relating to an embodiment of the present invention.

FIG. 2 is a diagram showing an overview of the search query generator apparatus relating to an embodiment of the present invention.

In FIG. 2, a computer (PC) 1 is a computer on which a user can work on a task, and comprises a search query generator apparatus having an information manipulation monitor unit 2, an information manipulation database (hereinafter simply referred to as "information manipulation DB") 3, a task detection unit 4, a task feature information extraction unit 5, and a query generation unit 6. The computer 1 is connected to a plurality of other computers (PCs), file servers and other devices via a network, not shown in the drawing.

It should be noted that in the present embodiment it is assumed that the computer 1 comprises the search query generator apparatus; however, a file server might be able to comprise the search query generator apparatus, for example, or the plurality of computers might be able to comprise separated components of the search query generator apparatus.

The information recording unit 7 represents an information recording unit in which the information that can be manipulated by a user via the computer 1 is recorded and the unit is present inside, outside, or on both sides of the computer 1.

The search query generator apparatus in the computer 1, as described in detail later, automatically detects the task of the user and generates queries by analyzing a plurality of information (sets of information) that the user is handling in the task. The generated query is presented to the user by the computer 1, for example, or the task-related information is searched by the computer 1 using the query.

In the search query generator apparatus shown in FIG. 2, the information manipulation monitor unit 2 monitors the manipulation of information, via the computer, by a user (accessing information, creation, printing, transmission, reception and reading emails, browsing of Web pages etc.), and detects the manipulation of information by the user via the computer. When the information manipulations are detected, data relating to the information manipulations such as the manipulation contents, the manipulation subject, and the manipulation date of the detected information manipulations is registered in the information manipulation DB 3. Consequently, it is possible to accumulate, in the information manipulation DB 3, all of the information manipulations that the user has performed with the computer, to analyze the information manipulations performed by the user with reference to the information manipulation DB 3, and to extract the information processing flow of the user and the transition of the information that the user handled.

The task detection unit 4 analyzes the information manipulations of the user with reference to the information manipulation DB 3 and detects a task of the user (from the start to the end of the task). Here, the task detection method might be a method for detection that functions by dividing the information manipulations of the user into certain time intervals (e.g. every 10 minutes or every 30 minutes), a method for detection that functions by extracting the segments (e.g., from the opening to the closing of a file) of information manipulations performed by the user, or a method for detection that functions by obtaining the change in the similarity between the sets of information that the user is handling. There is also a method for task detection that functions by combining the above methods and analyzing the information manipulations of the user.

For example, in the method for detection that functions by using the change in the similarity among the sets of information, the mapping of the set of information that the user is handling is performed on a document space. The document space is a vector space. The set of information corresponds to a vector in the vector space. Each element of the vector corresponds to a keyword included in the set of information or an attribute of the set of information. The value of an element can be a frequency of a keyword or an attribute. The task detection unit 4 performs, on the document space, mapping of the set of information for every segment determined in advance, such as the information manipulations of the user, or mapping at certain time intervals. At that time, an angle or inner product between the vector of the set of information mapped on the document space and the previously mapped vector is calculated and the similarity of the information that the user is handling is obtained. Here, since a huge change in the similarity signifies a significant change in the set of information that the user is handling, it is speculated that a task has changed, and the task is detected.

The task detection unit 4, when detecting a task, informs the task feature information extraction unit 5 of the information relating to the detected task (task information).

The task feature information extraction unit 5 extracts keywords and attributes to be the task feature information from the set of information that the user was handling in the task. Specifically, the task feature information extraction unit 5 first identifies the set of information that the user was handling in the task with reference to the information manipulation DB 3 after receiving the task information from the task detection unit 4. Next, the identified set of information is analyzed to extract keywords and attributes, and those keywords and attributes are given to the query generation unit 6.

The query generation unit 6 generates queries for searching for information related to the user's task by combining the keywords and attributes extracted by the task feature information extraction unit 5.

The generated queries may be, for example, presented to the user by the computer 1, or the computer 1 may search for the task related information using the queries.

Figure 1:
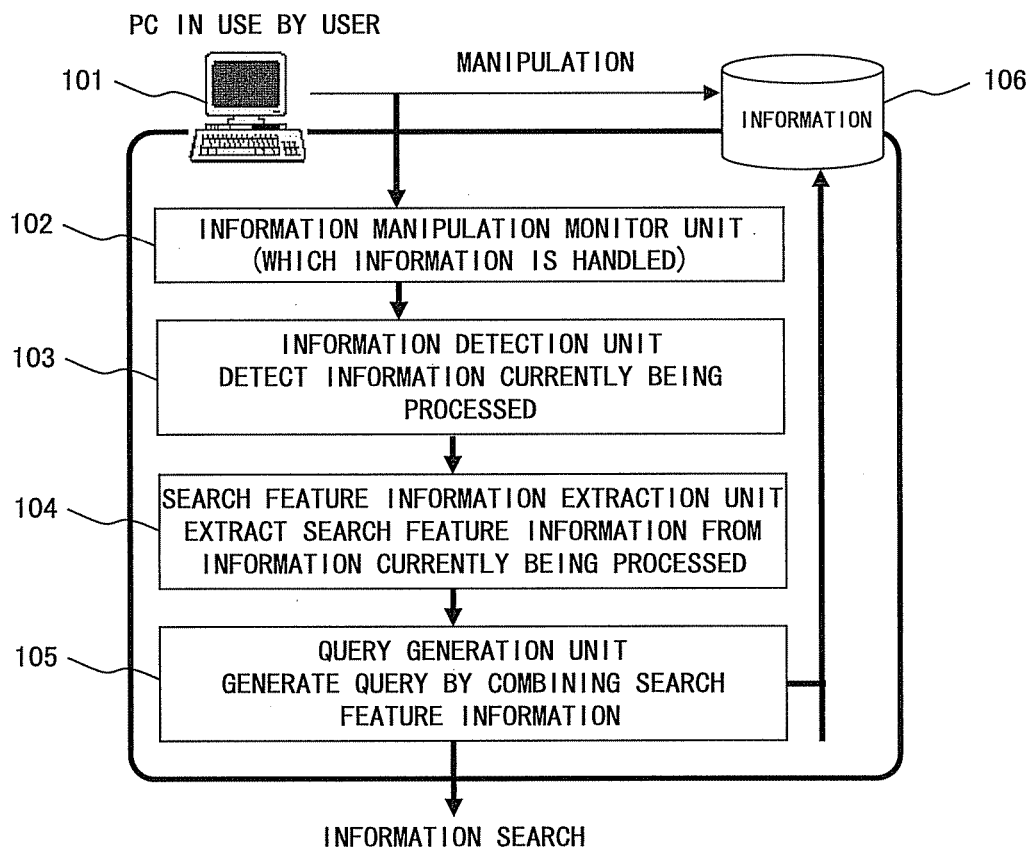
FIG. 1 is a diagram showing an overview of an existing apparatus for automatically generating queries.
Figure 3:
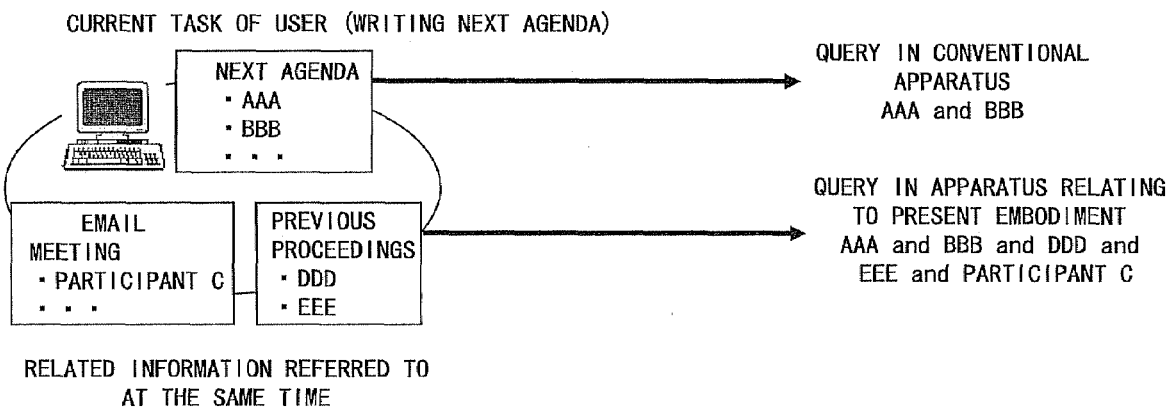
FIG. 3 is a diagram showing an example of operations of the search query generator apparatus relating to the present embodiment in contrast with the conventional apparatus.

FIG. 3 is a diagram showing an example of operations of the search query generator apparatus relating to the present embodiment in contrast with the conventional apparatus (see FIG. 1).

The example in FIG. 3 shows a case in which a user is currently referring to "email" information and "previous proceedings" information while creating (writing) "next topic" information with a computer, and this is a case of three types of information being accessed to at the same time.

In this case, in the conventional apparatus, even if there is a plurality of types of information that the user refers to at one time using a computer (in this case, the three information types "next topic", "email", and "previous proceedings"), queries are to be generated from "next topic" alone since the information being processed by the user currently is "next topic". In the example of FIG. 3, "AAA" and "BBB" are extracted as search feature information from the "next topic" information, and those feature information are combined to generate "AAA and BBB" as a query.

On the other hand, the search query generator apparatus relating to the present embodiment detects a task on which a user is working, extracts the set of information being handled at one time in the task, and generates a query. In the case of this example, the user conducts a task while referring to three kinds of information ("next topic", "email", and "previous proceedings"), the task feature information is extracted from these three kinds of information, and a query is generated. The example of FIG. 3 shows that from the three kinds of information "next topic", "email" and "previous proceedings", "AAA" and "BBB" in "next topic", "participant C" in "email", and "DDD" and "EEE" in "previous proceedings" are extracted as the task feature information, and these are combined to generate the query "AAA and BBB and DDD and EEE and participant C".

As in the example provided above, the search query generator apparatus relating to the present embodiment can automatically generate a query from all of the information that the user handles in a task (the "next topic", "email", and "previous proceedings" information) in addition to the information currently being processed by the user (the "next topic" information). Therefore, the information source of the query generation can be expanded several times in comparison with the conventional apparatus (there is only one information source in the conventional apparatus), thus enhancing the possibility of generating a query that is close to the information need of the user.

In the following description, details of the operation of the search query generator apparatus relating to the present embodiment are set forth for each component.

First, details of the operation of the information manipulation monitor unit 2 are explained with reference to FIG. 4 and FIG. 5.

The information manipulation monitor unit 2 monitors various manipulations relating to the information, detects the manipulation that the user performed, and registers the detected manipulation in the information manipulation DB 3. In the monitoring, the manipulations to all information that the user handled is monitored. For example, various kinds of information such as files, emails, address books, schedule books, images, and music can be the targets of manipulation monitoring. There are various monitoring-subject manipulations including open, closed, readout, writing, printing, copying, and moving of information, and focusing, maximizing, and minimizing of a window displaying the information, and these manipulations are detected.

FIG. 4 is a flowchart showing such operations of the information manipulation monitor unit 2.

As shown in FIG. 4, the information manipulation monitor unit 2 first determines whether or not monitoring-subject software is being run (being executed) in the monitoring-subject computer (S1). At this point, if S1 is NO, the operation is ended.

On the other hand, if S1 is YES, then whether or not information manipulation was performed by a user on the monitoring-subject software is determined next (S2). At this point, if the determination result is NO, the processing returns to S1.

If S2 is YES, then whether or not the information manipulation in S2 is the monitoring-subject information manipulation is determined next (S3). At this point, if the result is NO, the processing returns to S1.

If S3 is YES, then data relating to the information manipulation in S2 is next recorded (registered) in the information manipulation DB 3 (S4), and the processing returns to S1.

FIG. 5 is a diagram showing an example of data relating to the information manipulations recorded in the information manipulation DB 3 via the information manipulation monitor unit 2 operations shown in FIG. 4.

As shown in FIG. 5, the information manipulation DB 3 records a unique operation ID that is assigned to the information manipulation ("operation ID"), a date and time when the information manipulation was conducted ("date" and "time"), the contents of the information manipulation ("manipulation"), the subject of the manipulation in the information manipulation ("manipulation subject"), details of the manipulation recorded as necessary ("manipulation detail"), the name of the user who conducted the information manipulation ("user name"), and the name of the computer used in the performance of the information manipulation ("PC name").

Next, details of the operation of the task detection unit 4 are explained with reference to FIGS. 6-17. The task detection unit 4 examines the presence or absence of new information manipulation with reference to the information manipulation DB 3. If the new information manipulation is present at this point, the task of a user (task-detection subject user) is detected via task analysis, and the task feature information extraction unit 5 is informed of the detected task.

Note that as the method for the task detection unit 4 detecting the presence/absence of new information manipulation, there are methods such as detection by the task detection unit 4 regularly referring to the information manipulation DB 3, or detection by informing the task detection unit 4 of the information manipulation monitor unit 2 recording (registering) data relating to the information manipulation in the information manipulation DB 3 (see S4 in FIG. 4).

Figure 6:
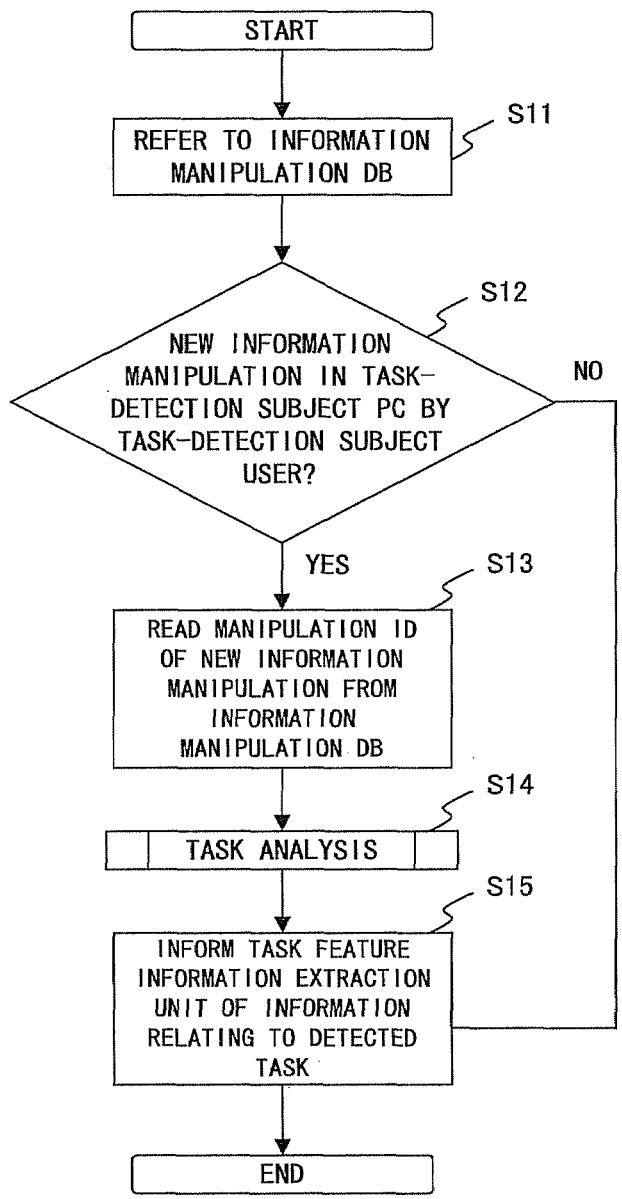
FIG. 6 is a flowchart showing the operation of the task detection unit.

FIG. 6 is a flowchart showing such operations of task detection unit 4.

As shown in FIG. 6, the task detection unit 4 first refers to the information manipulation DB 3 (S11). Next, the task detection unit 4 check whether there is data relating to the new information manipulation by the task-detection subject user in the task-detection subject computer (subject PC) is recorded in the information manipulation DB 3 (S12) that was referred to. If the result is NO at this point, the operation is ended.

On the other hand, if the result in S12 is YES, the manipulation ID of the latest information manipulation is read from the information manipulation DB 3 (S13).

Next, task analysis, explained in detail later, is performed on the basis of the read manipulation ID, and the task is detected (S14).

Next, the task feature information extraction unit 5 is informed of a task-starting manipulation ID and a task-ending manipulation ID or a list of all manipulation subjects handled in the task, explained later, as information relating to the detected task (S15), and the operation is ended.

Here, the task analysis performed in S14 is explained in further detail.

There are several methods of task analysis performed in S14:

(1) A method of detecting a task by extracting information manipulations at certain time intervals;
(2) A method of detecting a task by determining the flow of information manipulations;
(3) A method of detecting a task by comparing similarities of the sets of information (each set of information is a plurality of information) handled in the information manipulations; and
(4) A method of detecting a task by combining the above methods.

The task analyses using each of these methods (1)-(4) are explained in that order.

The task analysis employing method (1) is first explained with reference to FIG. 7 and FIG. 8.

FIG. 7 is a flowchart of a case of the task analysis employing method (1).

As shown in FIG. 7, in such a case, the task detection unit 4 obtains the manipulation ID of the latest information manipulation read from the information manipulation DB 3 in S13 in FIG. 6 as a task-ending manipulation ID (S21).

Next, the time and date of the latest information manipulation is obtained (S22).

From the time and date of the latest information manipulations obtained in S22, the time and date with a certain pre-defined time unit subtracted is obtained as the task starting time and date (S23). Note that the certain time unit is a certain time interval in which a task is detected by extracting the information manipulations at certain time intervals, and it is a predetermined time interval such as 30 minutes, 1 hour, 1 day or 1 week.

The manipulation ID of the first information manipulation after the task starting time and date is obtained as the task-starting manipulation ID (S24).

The information manipulations from the task-starting manipulation ID obtained in S24 to the task-ending manipulation ID obtained in S21 are detected as a task (S25), and the task analysis is ended.

Here, a specific example of a case of the task analysis employing method (1) is explained with reference to FIG. 8.

FIG. 8 is a diagram showing an example of data relating to the information manipulations registered in the information manipulation DB 3.

In this example, the information manipulation of the manipulation ID (0012) shown in FIG. 8 is assumed to be the latest information manipulation, and the time unit in the task analysis is set to 30 minutes.

In such a case, the manipulation ID (0012) of the latest information manipulation is first obtained as the task-ending manipulation ID, and the time and date at which the information manipulation occurred (Sep. 13, 2006 11:00 AM) is obtained. Next, the time and date with 30 minutes subtracted from the above time and date (Sep. 13, 2006 10:30 AM) is obtained as the task starting time and date. The manipulation ID (0010) of the first information manipulation after the task starting time and date is obtained as the task-starting manipulation ID. Next, the information manipulations from the task-starting manipulation ID (0010) to the task-ending manipulation ID (0012) (the black section in FIG. 8) is detected as a task.

According to such a task analysis realized by employing method (1), the task relating to the set of information handled in a certain time span in addition to the task relating to the information that a user is currently handling can be detected.

The task analysis that employs method (2) is explained with reference to FIG. 9 and FIG. 10.

In the task analysis that employs method (2), from the opening to the closing of a specific set of information by a user, for example, is considered to be one task, and a task is detected from such an information manipulation flow. If the user performs information manipulations on other information during one task, such information manipulations are also detected as the information manipulations performed for the same task.

FIG. 9 is a flowchart for a case of such a task analysis that employs method (2).

As shown in FIG. 9, in such a case, the task detection unit 4 obtains the manipulation ID of the latest information manipulation read from the information manipulation DB 3 in S13 of FIG. 6 (hereinafter simply referred to as "latest information manipulation ID") and the manipulation of the information manipulation (e.g. open or closed etc.) (S31).

Next, whether or not the obtained manipulation is the manipulation relating to the start of accessing the information is determined (S32). If the result is NO at this point, the processing proceeds to S35.

On the other hand, if the result of S32 is YES, then whether or not there is information currently being accessed to other than the information accessed to in the manipulation is determined (S33). If the result is YES at this point, the processing proceeds to S35.

If the result of S33 is NO, then the latest information manipulation ID obtained in S31 is set as the task-starting manipulation ID and is stored in internal RAM (Random Access Memory) etc. (S34).

Next, after S34, S32 (in the case of NO at S32) or S33 (in the case of YES at S34) the latest information manipulation ID obtained in S31 is set as the task-ending manipulation ID (S35).

The information manipulations from the task-starting manipulation ID to the task-ending manipulation ID is detected as a task (S36), and the task analysis is ended.

Here, a specific example of the task analysis that employs method (2) is explained with reference to FIG. 10.

FIG. 10 is a diagram showing an example of data relating to information manipulations registered in the information manipulation DB 3.

In this example it is assumed that the information manipulation of the manipulation ID (0009) shown in FIG. 10 is the latest information manipulation.

In such a case, the manipulation ID (0009) is obtained as the latest information manipulation ID, and the manipulation "close" of the information manipulation (the manipulation ID (0009)) is obtained. Since the manipulation "close" is not the manipulation relating to the start of accessing the information, the manipulation ID (0009) is set as the task-ending manipulation ID.

Note that for the task-starting manipulation ID, at a point in the past when a manipulation ID (0002) is obtained as the latest information manipulation ID and the manipulation of the information manipulation (open) is obtained, the manipulation (open) is the manipulation relating to the start of the accessing information, and no other information was accessed to at that time. Therefore, the manipulation ID (0002) is set as the task-starting manipulation ID.

After the manipulation ID (0009) is set as the task-ending manipulation ID, the information manipulations from the task-starting manipulation ID (0002) to the task-ending manipulation ID (0009) (the black section in FIG. 10) is detected as a task.

According to such a task analysis that employs method (2), a task corresponding to the flow of the manipulation of information by a user can be detected.

The task analysis that employs method (3) is explained with reference to FIG. 11 and FIG. 12.

In the task analysis that employs method (3), the task detection unit 4 performs mapping of the set of information that a user handled in the information manipulations on a vector space. Each vector in a vector space corresponds to a document, a web page, an e-mail or etc in the set of information. Here, the elements of each vector are the frequency of keywords and attributes contained in the each information. The task detection unit 4 compares the vectorial sum of the each information in the set of information handled in the previous information manipulations with the vector of the information handled in the new information manipulations for the similarity, and the task is detected on the basis of the difference in the values. A case of high similarity signifies that the user has been handling similar information. It is then determined that the task of the user has been continued, and information handled in the new information manipulations is added to a task manipulation subject table. On the other hand, a case of low similarity signifies a significant change in the contents of the information that the user is handling. It is then determined that the user has started a new task, a new manipulation subject table is created, and information handled in the new information manipulations is registered in the table. Note that a threshold for determining high similarity versus low similarity should be set in advance. The created manipulation subject table is stored in the internal RAM or other such place.

Figure 11:
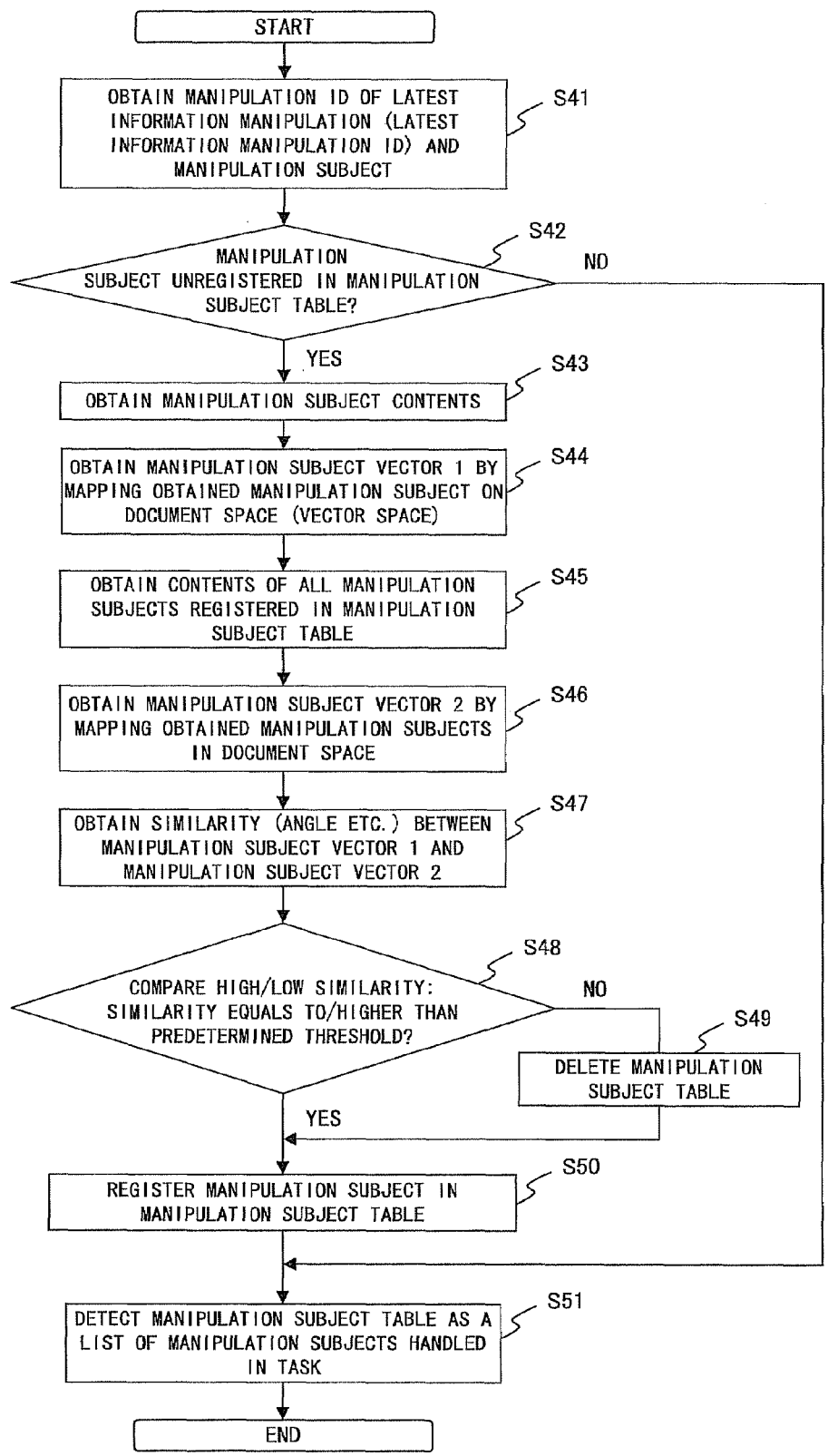
FIG. 11 is a flowchart of a case in which the task analysis employs the method for detecting a task by comparing the similarity among the elements of a set of information (a plurality of elements of information) handled in information manipulations.

FIG. 11 is a flowchart of such a task analysis realized by employing method (3).

As shown in FIG. 11, in such a case, the task detection unit 4 obtains the manipulation ID of the latest information manipulation read from the information manipulation DB 3 in S13 of FIG. 6 and the manipulation subject of the information manipulation (e.g. file A, file B etc.) (S41).

Next, whether or not the obtained manipulation subject is unregistered in the manipulation subject table is determined (S42). If the result is NO at this point, the processing proceeds to S51.

On the other hand, if the result of S42 is YES, the contents of the manipulation subject is obtained (S43). The obtained contents are mapped on a document space, and a manipulation subject vector 1 is obtained (S44).

Next, the contents of all manipulation subjects registered in the manipulation subject table are obtained (S45), the obtained contents are mapped on the document space, and the manipulation subject vector 2 is obtained (S46).

Subsequently, the similarity of the manipulation subject vector 1 and the manipulation subject vector 2 (e.g. angles and inner products) are obtained (s47). Note that if the similarity of the two vectors is determined by, for example, the angle and inner product of the two, then whether their similarity is high or low can be represented by degrees rather than by binary digits such as 0 and 1.

In order to compare the highness or lowness of the similarity, it is determined if the obtained similarity is equal to or higher than a predetermined threshold (S48). The similarity is high if it is equal to or higher than the threshold, and the similarity is low if it is lower than the threshold. If the result is NO at this point, then the manipulation subject table is deleted (S49) and the processing proceeds to S50.

On the other hand, if the result of S48 is YES, then the manipulation subject obtained in S41 is registered additionally in the current manipulation subject table, or if after the process is on a step later than S49, a new manipulation subject table is created and the manipulation subject obtained in S41 is registered in the new table (S50).

Next, the manipulation subject table is detected as a list of the manipulation subjects being handled in the task (S51), and the task analysis is ended. Note that the detection of the manipulation subject table as a list of the manipulation subjects handled in the task is the same as the detection of the task handling the manipulation subjects being registered in the manipulation subject table as a task.

Here, a specific example of the task analysis employing method (3) is explained with reference to FIG. 12A, FIG. 12B, FIG. 12C and FIG. 13.

Figure 13:
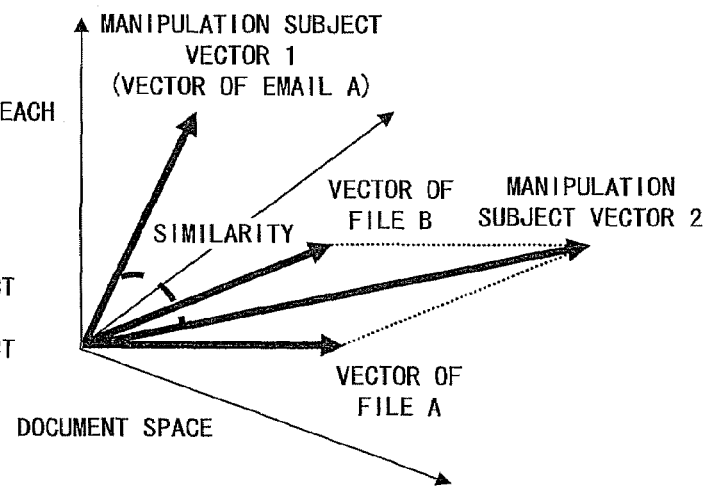
FIG. 13 is a diagram showing an example of a document space on which manipulation subjects are mapped.

FIG. 12A is a diagram showing an example of data relating to the information manipulations registered in the information manipulation DB 3, FIG. 12B is a diagram showing the contents of the manipulation subject table before the manipulation ID (0009) is registered in the information manipulating DB 3, and FIG. 12C is a diagram showing the contents of the manipulation subject table after the manipulation ID (0009) is registered in the information manipulating DB 3. FIG. 13 is a diagram showing an example of a document space on which manipulation subjects are mapped. Note that in the document space shown in FIG. 13, the vector components are the frequencies of each word included in the manipulation subject, and similarity is the size of the angle between the manipulation subject vector 1 and the manipulation subject vector 2.

In this example it is assumed that the information manipulation of the manipulation ID (0009) shown in FIG. 12A is the latest information manipulation.

In such a case, first the manipulation IS (0009) is obtained as the latest information manipulation ID and the content of the manipulation subject (email A) is obtained. The email A is mapped on a document space, and the manipulation subject vector 1 (see FIG. 13) is obtained. The components of manipulation subject vector 1 are calculated from the content of the manipulation subject (email A).

Next, the contents (file A and file B) of all manipulation subjects registered in the manipulation subject table (see FIG. 12B) are obtained. The file A and file B are mapped on a vector space, and the manipulation subject vector 2 (see FIG. 13) is obtained from the vectorial sum of the vector of file A and file B.

The similarity between the manipulation subject vector 1 and the manipulation subject vector 2 (the angle between the two in this example) is obtained, and whether or not the value is equals to or larger than a threshold value is determined.

If the value is not equal to or larger than the threshold value in this determination, the previous manipulation subject table (see FIG. 12B) is discarded. A new manipulation subject table is then created, and the content (email A) of the manipulation subject of the latest information manipulation ID (0009) is registered (see FIG. 12C). This manipulation subject table is, then, detected as a list of the manipulation subjects handled in the task.

According to such a task analysis realized by employing method (3), it is possible to detect a task in accordance with the contents of the information manipulations performed by a user.

Next, the task analysis that employs method (4) is set forth.

Here, as task analyses that employ method (4), a task analysis employing a method that combines method (1) and method (3) and a task analysis employing a method that combines method (2) and method (3) are explained.

The task analysis employing a combination of method (1) and method (3) is explained first with reference to FIG. 14, FIG. 15A, FIG. 15B and FIG. 15C.

In the task analysis that employs the method combining (1) and (3), the task detection unit 4, after extracting information manipulations at certain time intervals, detects a task using the similarity of the information handled by the user at the time of extraction.

FIG. 14 is a flowchart of such a task analysis realized by employing the combination of methods (1) and (3).

In FIG. 14, the processing from S61 to S64 is the same as the processing from S21 to S24 shown in FIG. 7, and therefore the explanation is omitted.

When S64 ends, the manipulation subjects from the task-starting manipulation ID obtained in S64 and the task-ending manipulation ID obtained in S61 are obtained (S65), the obtained manipulation subjects are mapped on a document space (which is a vector space), and the manipulation subject vector 1 is obtained from the vectorial sum of each vector of the manipulation subjects (S66).

In S67 that follows and after, the same processing as in S45 and after shown in FIG. 11 is performed, and thus the explanation is omitted in this description.

A specific example of the task analysis using the method that combines methods (1) and (3) is set forth with reference to FIG. 15A, FIG. 15B, and FIG. 15C.

FIG. 15A is a diagram showing an example of data relating to the information manipulations registered in the information manipulation DB 3, FIG. 15B is a diagram showing the contents of the manipulation subject table before the manipulation ID (0009) is registered in the information manipulation DB 3, and FIG. 15C is a diagram showing the contents of the manipulation subject table after the manipulation ID (0009) is registered in the information manipulation DB 3.

It is assumed in this example that the information manipulation of the manipulation ID (0009) shown in FIG. 15A is the latest information manipulation and that the certain time unit in the task analysis is 15 minutes.

In such a case, the manipulation ID (0009) of the latest information manipulation is first obtained as the task-ending manipulation ID, and the time and date of the information manipulation (Sep. 13, 2006 10:25 AM) is obtained. Next, 15 minutes are subtracted from the obtained time and date, the time and date (Sep. 13, 2006 10:10 AM) is obtained as the task starting time and date, and the manipulation ID (0003) of the latest information manipulation after the task starting time and date is obtained. Subsequently, the contents (file A, file B, and email A) of the manipulation subjects handled in the information manipulations from the task-starting manipulation ID (0003) to the task-ending manipulation ID (0009) are obtained. The obtained subjects are mapped on a document space, and the manipulation subject vector 1 is obtained from the vectorial sum.

The contents (file A and file B) of all the manipulation subjects registered in the manipulation subject table (see FIG. 15B) are obtained, the manipulation subjects (file A and file B) are mapped on a vector space, and the manipulation subject vector 2 is obtained from the vectorial sum.

Afterwards, the similarity between manipulation subject vector 1 and manipulation subject vector 2 (e.g. the angle of the two) is obtained, and whether or not the value is equal to or larger than a threshold value is determined.

If the value is determined to be equal to or larger than the threshold in this determination, the manipulation subject s (file A, file B, and email A) of the manipulation subject vector 1 are registered additionally (see FIG. 15C) in the manipulation subject table (see FIG. 15B). Note that if the manipulation subjects overlap (if file A and file B overlap in this example), then the subjects are overwritten and registered once again.

The manipulation subject table (see FIG. 15C) is detected as a list of manipulation subjects handled in a task.

In the task analysis that employs the method combining methods (1) and (3), a user's task can be detected with less loading than when detecting a user's task using the similarity among sets of information alone.

The task analysis employing a combination of method (2) and method (3) is explained with reference to FIG. 16, FIG. 17A, FIG. 17B and FIG. 17C.

In the task analysis employing the method combining methods (2) and (3), the task detection unit 4, after determining the flow of the information manipulations, detects a task using the similarity of the information handled by the user at the flow.

Figure 16:
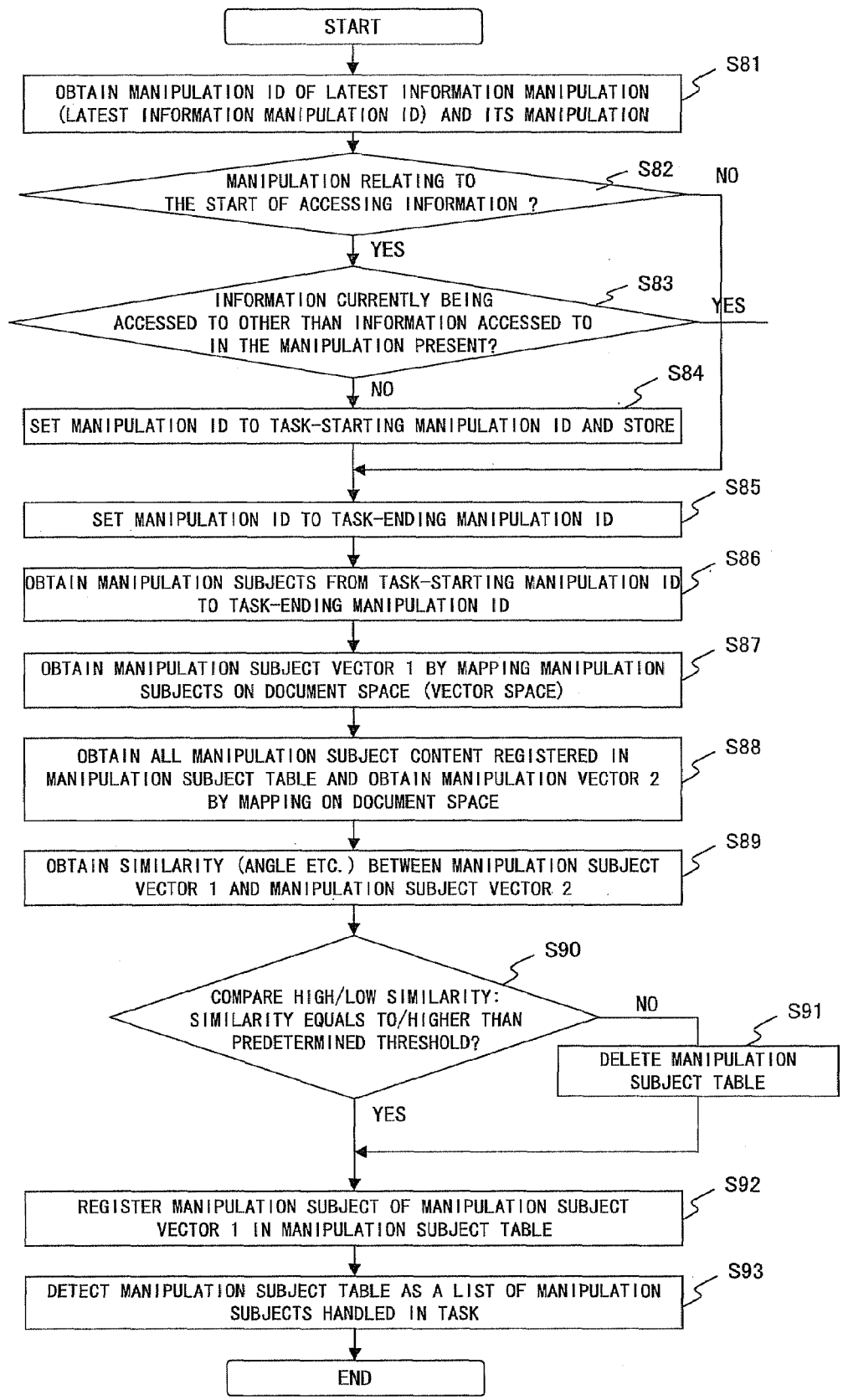
FIG. 16 is a flowchart of a case in which the task analysis employing the method for detecting a task after determining the flow of information manipulations by using the similarity of information handled by a user during the flow.

FIG. 16 is a flowchart of such task analysis employing the method combining methods (2) and (3).

In FIG. 16, the processing from S81 to S85 is the same as the processing from S31 to S35 shown in FIG. 9, and therefore the explanation is omitted.

When S85 ends, the contents of the manipulation subjects from the task-starting manipulation ID and the task-ending manipulation ID are obtained (S86), the obtained manipulation subjects are mapped on a document space (which is a vector space), and the manipulation subject vector 1 is obtained from the vectorial sum of each vector of the manipulation subjects (S87).

In S88 that follows and after, the same processing as S45 and after shown in FIG. 11 is performed and thus the explanation is omitted in this description.

A specific example of the task analysis using the method that combines methods (2) and (3) is set forth with reference to FIG. 17A, FIG. 17B, and FIG. 17C.

FIG. 17A is a diagram showing an example of data relating to the information manipulations registered in the information manipulation DB 3, FIG. 17B is a diagram showing the contents of the manipulation subject table before the manipulation ID (0009) is registered in the information manipulation DB 3, and FIG. 17C is a diagram showing the contents of the manipulation subject table after the manipulation ID (0009) is registered in the information manipulation DB.

In this example it is assumed that the information manipulation of the manipulation ID (0009) shown in FIG. 17A is the latest information manipulation.

In such a case, the manipulation ID (0009) is first obtained as the latest information manipulation ID, and the manipulation (open) of the information manipulation is obtained. Since the manipulation (open) is a manipulation relating to the start of accessing the information and there is no other information being accessed to, the manipulation ID (0009) is set as the task-starting manipulation ID. The manipulation ID (0009) is also set as the task-ending manipulation ID.

The content (email A) of the manipulation subject handled in the information manipulations from the task-starting manipulation ID (0009) to the task-ending manipulation ID (0009) is obtained. The obtained manipulation subject (email A) is mapped on a document space, and the manipulation subject vector 1 is obtained.

Next, the contents of all manipulation subjects registered in the manipulation subject table (see FIG. 17B) are obtained, the manipulation subjects (file A and file B) are mapped on a vector space, and the manipulation subject vector 2 is obtained from the vectorial sum.

Afterwards, the similarity between the manipulation subject vector 1 and the manipulation subject vector 2 (e.g. the angle between the two) is obtained, and whether or not the value is equal to or larger than a threshold value is determined.

If the value is determined to be equal to or larger than the threshold value in this determination, the contents (file A) of the manipulation subject of the manipulation subject vector 1 are registered additionally (see FIG. 17C) in the current manipulation subject table (see FIG. 17B).

The manipulation subject table (see FIG. 17C) is detected as a list of manipulation subjects handled in a task.

By the task analysis employing the method that combines methods (2) and (3), a user's task can be detected with less loading than when detecting a user's task using the similarity among sets of information alone. In a case of handling sets of information of completely different types for one operation object, additionally, since a task is detected by employing information manipulation flow, the task can be detected more accurately than when the detection is performed employing sets of information alone.

In the following description, details of the operation of the task feature information extraction unit 5 are set forth with reference to FIG. 18 and FIG. 19.

The task feature information extraction unit 5 reads out the contents and attributes of the set of information handled in the task detected by the task detection unit 4, and extracts task feature information. For example, if the contents of the set of information contain letter strings, keywords are extracted by performing a morphological analysis or n-gram processing etc. on each letter string. By extracting keywords as the task feature information in such a manner, it is possible to extract the context and purpose of the task. The attributes of the set of information include manipulation subject names (file name, email subject etc.), names of the destination to store the manipulation subject (folder name, address book etc.), owner, and update time and date. As described above, by extracting attribute as the task feature information, it is possible to extract a trend that is common in the task. The task feature information such as keywords and attributes extracted by the task feature information extraction unit 5 can be passed on to the query generation unit 6 or can be passed on to the query generation unit 6 after adding weight using TF (Term Frequency), IDF (Inverted Document Frequency), etc.

Figure 18:
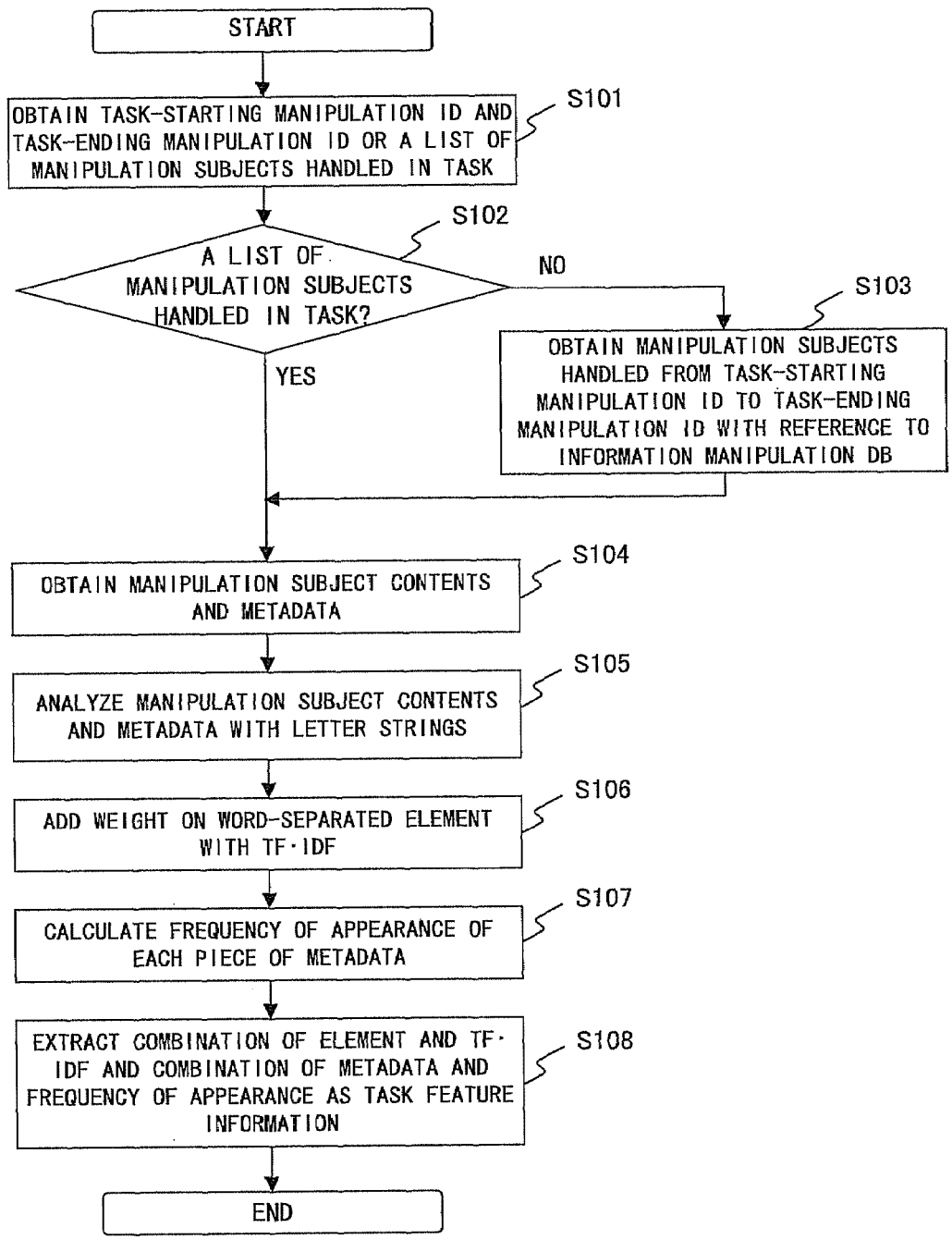
FIG. 18 is a flowchart showing the operation of the task feature information extraction unit.

FIG. 18 is a flowchart showing such an operation of the task feature information extraction unit 5.

As shown in FIG. 18, the task feature information extraction unit 5 first obtains information relating to the task notified from the task detection unit 4 that is the task-starting manipulation ID and the task-ending manipulation ID, or a list of the manipulation subjects handled in the task (S101).

Next, whether or not the obtained information is a list of the manipulation subjects handled in the task is determined (S102). If the result is NO at this point, or in other words if the obtained information includes the task-starting manipulation ID and the task-ending manipulation ID, the manipulation subjects handled in the information manipulations from the task-starting manipulation ID to the task-ending manipulation ID are obtained with reference to the information manipulation DB 3 (S103), and the processing proceeds to S104.

On the other hand, if the result in S102 is YES or after S103, the contents of the manipulation subjects and its metadata are obtained (S104).

The obtained contents of the manipulation subjects and metadata containing letter strings are analyzed (S105). The analyses for letter strings are conducted by using morphological analysis, n-gram processing, or the like. As the result of the analysis, keywords are obtained.

TF•IDF (the product of TF and IDF) of each element (keyword) into which words are separated is calculated (S106).

Next, the frequency of appearance of each piece of metadata other than the letter strings is calculated (S107).

The combinations of each keyword with TF•IDF and the combinations of each piece of metadata with the frequency of appearance are extracted as task feature information (S108), and the operation ends.

Figure 19:
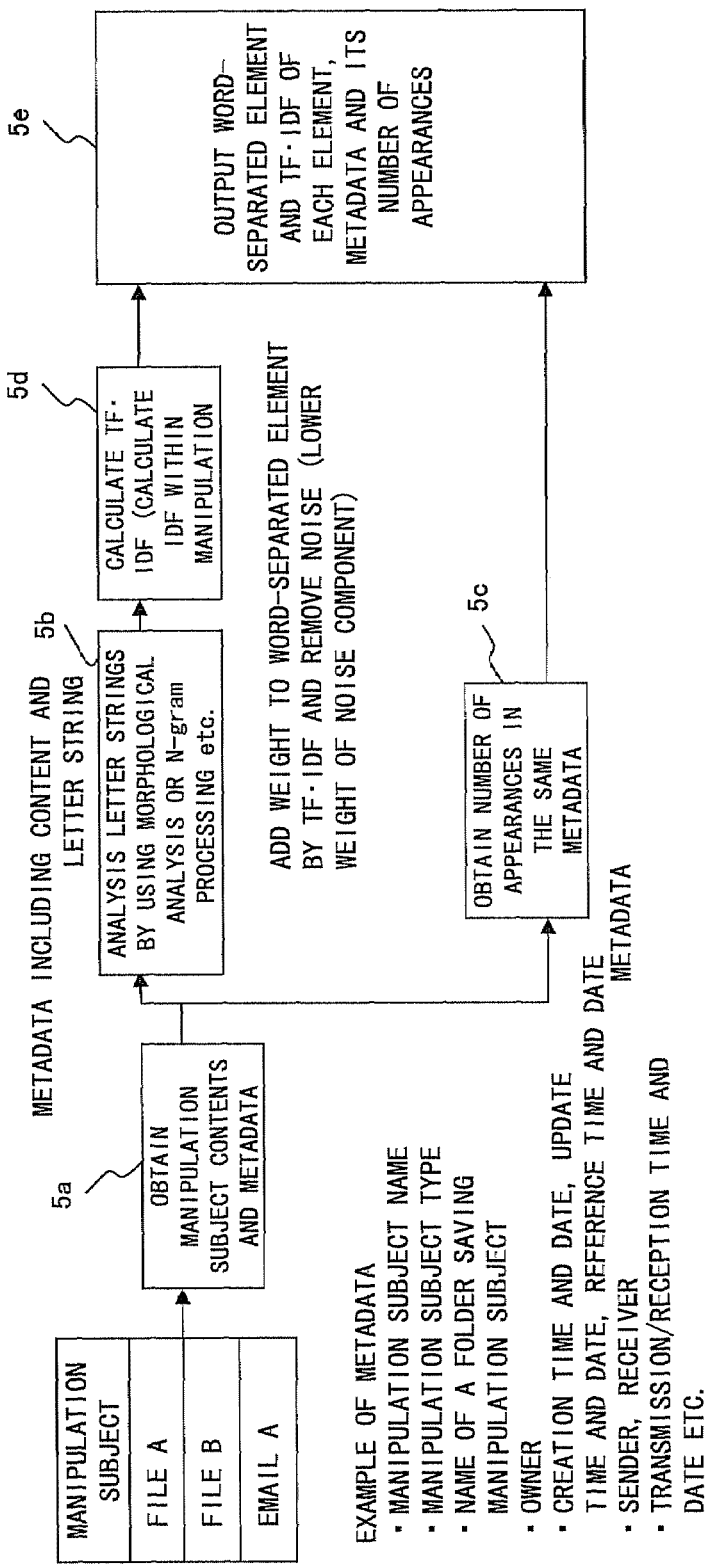
FIG. 19 is a diagram showing an example of a configuration of the task feature information extraction unit.

FIG. 19 is a diagram showing an example of a configuration of the task feature information extraction unit 5, which performs the processing shown in FIG. 18.

As shown in FIG. 19, in the task feature information extraction unit 5, unit 5a obtains the contents of the manipulation subject and its metadata from the input manipulation subject, outputs the contents of the manipulation subject and the metadata containing letter strings to unit 5b and metadata other than letter strings to unit 5c. Note that the example of FIG. 19 indicates that file A, file B and email A registered in the list of the manipulation subjects are input into the unit 5b as the manipulation subject. In this case also, unit 5a obtains the manipulation subject name, the manipulation subject type (e.g. images and sound etc.), the name of a folder saving the manipulation subject, the owner, the creation time and date, the update time and date, the reference time and date, the sender, the receiver, the transmission/reception time and date, etc. as metadata.

When the contents of the manipulation subject and the metadata containing letter strings (e.g. manipulation subject name) are input, unit 5b analyzes them via morphological analysis or n-gram processing etc., separates words, and outputs the word-separated elements (keywords) to unit 5d.

Unit 5d, when the word-separated elements are input, calculates TF•IDF of each element and outputs the word-separated elements and TF•IDF of each element to unit 5e. As a result, the word-separated elements are added with the weight of TF•IDF included, enabling the removal of noise (or the reduction of the weight of the noise component). Note that IDF is calculated from the set of the manipulation subjects. In the example of FIG. 19, IDF is calculated from the set of file A, file B and email A.

Unit 5c, when metadata other than letter strings (e.g. transmission time and date etc.) is input, obtains the frequency of appearance of the same metadata and outputs the metadata and the frequency of appearance to unit 5e.

Unit 5e outputs the word-separated elements and TF•IDF of each element input from unit 5d and the metadata and the frequency of its appearance input from unit 5c as the task feature information.

It should be noted that in the present embodiment, the task feature information extraction unit 5 extracts (outputs) the TF•IDF of each of the word-separated element as the task feature information. However, it is also possible to extract (output) the TF and/or IDF of the word-separated elements, or to extract (output) the TF and/or DF (Document Frequency) of the word-separated elements. In such a manner, by extracting TF•IDF, TF and/or IDF, or TF and/or DF as task feature information, it is possible to extract the points on which a user places importance in a task.

Details of the operation of the query generation unit 6 are explained with reference to FIG. 20.

The query generation unit 6 can generate queries using keywords (word-separated elements) and attributes (metadata) etc. extracted by the task feature information extraction unit 5 without modification. The query generation unit 6 can generate queries in accordance with the conditions of a system that conducts search. For example, if a search system is a BOOLEAN search system, queries are generated by connecting each piece of task feature information with logical expressions such as AND and OR. In such a system, it is possible to generate queries of contents without omission. Alternatively, in a search system using a vector space, a vector having each piece of task feature information as an element is generated as query by mapping each piece of task feature information on a vector space. In such a case, it is possible to generate queries similar to the task contents.

The query generation unit 6 generates a query or queries using high-weight task feature information alone based on the weight of each piece of task feature information extracted by the task feature information extraction unit 5. In such a case, in order to determine whether or not the task feature information is used, the threshold of the weight is determined in advance. Note that weight in each of the pieces of task feature information can be created by combining the frequency of the task feature information and/or the number of documents that include the task feature information. For example, the weight can be created by combining the TF and/or DF of the word-separated element. As a result, queries using the task feature information on which a user places importance can be generated.

Figure 20:
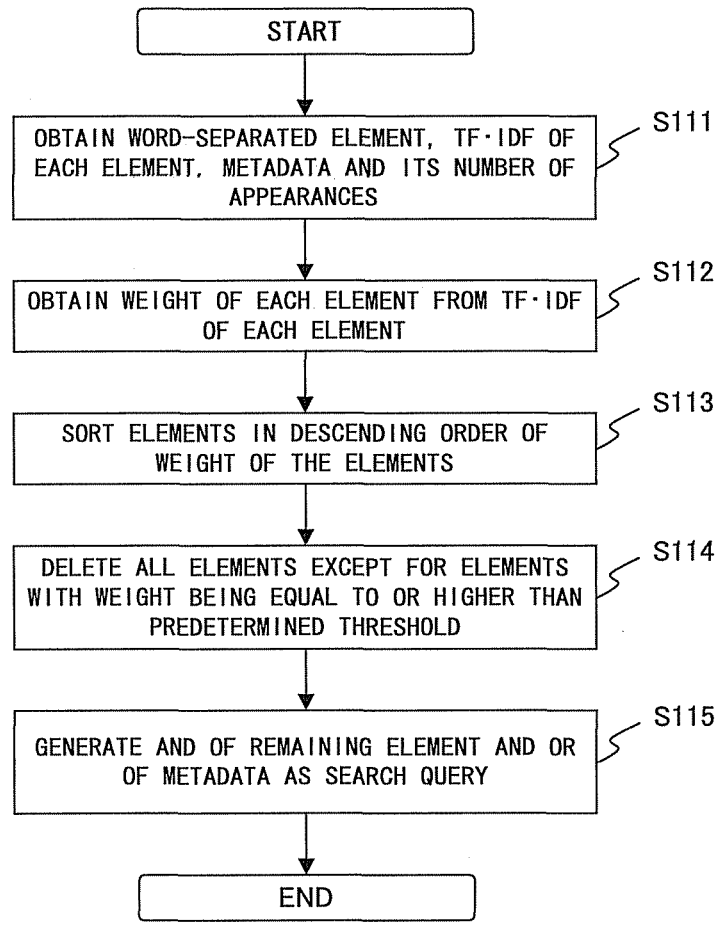
FIG. 20 is a flowchart showing the operation of the query generation unit for generating queries by using the task feature information with a large weight alone.

FIG. 20 is a flowchart showing the operation of the query generation unit 6 for generating queries by using such high-weight task feature information alone.

As shown in FIG. 20, the query generation unit 6 first obtains word-separated elements and the TF•IDF of each element, and the metadata and the frequency of its appearance from the task feature information extraction unit 5 (S111).

Next, the weight in each element is obtained from the TF•IDF of each element (S112).

Next, the elements are sorted in descending order of element weight (S113), and elements other than those with a weight equal to or larger than the predetermined threshold are deleted (S114).

A logical product (AND) of the remaining element and a logical sum (OR) of the metadata are generated as search queries (S115), and the operation ends.

It should be noted that in addition to the method according to the flowchart shown in FIG. 20, there are other methods of generating search queries, as below.

For example, in the method of the flowchart shown in FIG. 20, there is a method for generating a search query without using metadata. There is also a method such that, on the basis of the obtained metadata and the number of times it appears, search queries can be generated by using only metadata indicating that the number of times the data appears is greater than a prescribed threshold. Additionally, there is a method such that, using the TF•IDF of the word-separated element, the word-separated element can be mapped on a document space, and the mapped elements can be assigned to be the search queries.

For example, the computer 1 comprising the search query generator apparatus shown in FIG. 2 is implemented on an information processor apparatus (computer), shown in FIG. 21.

The information processing apparatus shown in FIG. 21 comprises a CPU (central processing unit) 11, memory 12, an input device 13, an output device 14, an external storage device 15, a media driving apparatus 16, and a network connector apparatus 17, and these are connected to each other by a bus 18.

The memory 12 includes ROM (Read Only Memory) and RAM etc., and stores programs and data used for processing. CPU 11 performs necessary processing by executing a program using the memory 12.

The information manipulation monitor unit 2, the task detection unit 4, the task feature information extraction unit 5, and the query generation unit 6 correspond to the programs stored in the memory 12, or to their functions.

The input device 13 may be, for example, a keyboard, a pointing device, a touch panel etc., and is used for inputting information and instruction by a user. The output device 14 may be, for example, a display, a printer, a speaker etc., and is used for outputting inquiries to a user, outputting the result of processing, etc.

The external storage device 15 can be, for example, a magnetic disk device, an optical disk device, a magnetic optical disk device, or a tape device. The information processor device stores the above programs and data in the external storage device 15, and loads the programs and data in the memory 12 to be used as necessary.

The media driving apparatus 16 drives a portable storage medium 19 and accesses the stored contents. The portable storage medium 19 can be any computer-readable recording medium such as a memory card, flexible disk, CD-ROM (compact disk read only memory), optical disk, magnetic optical disk or any combination of these. A user stores the programs and data in the portable recording medium 19 and loads the program and data into the memory 12 for use as necessary.

The information manipulation DB 3 stores data on the memory 12, the external storage device 15, or the portable storage medium 19. The information storage unit 7 shown in FIG. 2 corresponds to the memory 12, the external storage device 15, or the portable storage medium 19.

The network connector apparatus 17 is connected to a communication network such as LAN (Local Area Network) or the Internet etc., and performs data exchanges associated with the communication. The information processor apparatus receives the programs and data from the external apparatuses via the network connector apparatus 17 as necessary and loads the program and data for use.

Figure 22:
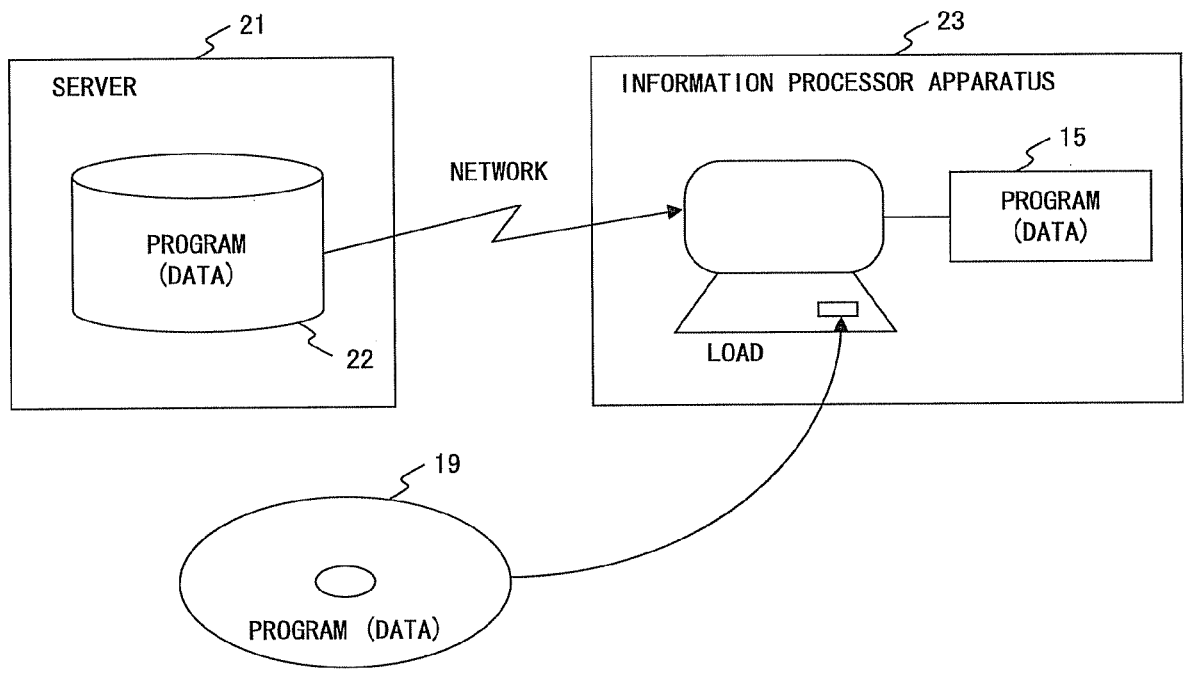
FIG. 22 is a diagram showing a computer-readable storage medium.

FIG. 22 shows a computer-readable storage medium, which can supply programs and data to the information processor apparatus in FIG. 21. The programs and data stored in the portable storage medium 19 and a database 22 of a server 21 are loaded into the memory 12 of the information processor apparatus 23. The server 21 generates a carrier signal for carrying the programs and data and transmits the signal to the information processor apparatus 23 via any transmission medium on the network. CPU 11 executes the programs using the data and performs necessary processing.

Details of the present invention are provided above; however, the present invention is not to be limited by the above embodiments, but is to be construed as embodying various modifications and alternative constructions that fairly falls within the scope of the present invention.

According to the present invention, queries can be automatically generated from all of the information that a user handles in a task, including information that the user referred to in the task or copied data in addition to information being processed by the user.

What is claimed is:

1. A search query generator apparatus comprising:
a computing device including a processor;
a memory to store information of a first manipulation subject of a first information manipulation performed by a user with a computer; and
an information manipulation database, wherein
the computing device includes:
   an information manipulation monitor unit to detect a second information manipulation that the user has performed with the computer by monitoring the second information manipulation in the computer performed by the user; and
   a task detection unit to detect a plurality of information manipulations as a task of the user by analyzing information accumulated in the information manipulation database,
wherein the information manipulation database accumulates information of a second manipulation subject of the second information manipulation detected by the information manipulation monitor unit,
the task detection unit judges whether the second manipulation subject accumulated in the information manipulation database corresponds to the first manipulation subject stored in the memory, maps the first manipulation subject and the second manipulation subject in a vector space to obtain a first manipulation subject vector and a second manipulation subject vector when the second manipulation subject does not correspond to the first manipulation subject, obtains similarity between the first manipulation subject vector and the second manipulation subject vector, adds the information of the second manipulation subject to the memory when the similarity is higher than a threshold, and detects the first and second manipulation subjects stored in the memory as manipulation subjects handled in the task, and
the task detection unit detects that the user has started another task for handling the second manipulation subject when the similarity is lower than the threshold,
wherein the computing device further includes: a task feature information extraction unit to identify a set of information handled in the task from the task detected by the task detection unit and to extract task feature information characterizing the task from the set of information, wherein the task detection unit detects a user task by separating information manipulations into certain time intervals.

2. The search query generator apparatus according to claim 1, wherein the computing device further includes:
a query generator unit to generate a search query by combining task feature information extracted by the task feature information extraction unit.

3. The search query generator apparatus according to claim 1, wherein
the task detection unit detects a user task by determining a flow of the information manipulations.

4. The search query generator apparatus according to claim 1, wherein
the task detection unit detects a user task by determination on the basis of similarity of sets of information handled in separated information manipulations after separating information manipulations into certain time intervals.

5. The search query generator apparatus according to claim 1, wherein
the task detection unit detects a user task by determination on the basis of similarity of sets of information handled in separated information manipulations after separating information manipulations by determining a flow of the information manipulations.

6. The search query generator apparatus according to claim 1, wherein
the task detection unit defines an inner product of the first and second manipulation subject vectors as the similarity.

7. The search query generator apparatus according to claim 1, wherein the task feature information extraction unit extracts keywords from the contents of the identified set of information and defines those as task feature information.

8. The search query generator apparatus according to claim 7, wherein
the task feature information extraction unit defines the extracted keywords and the frequency of each counted keyword and/or the number of documents that include the keyword as task feature information.

9. The search query generator apparatus according to claim 1, wherein the task feature information extraction unit extracts attributes of the identified set of information and defines those as task feature information.

10. The search query generator apparatus according to claim 1, wherein the computing device further includes:
a query generator unit to generate a search query expressed as a logical expression by connecting the task feature information extracted by the task feature information extraction unit.

11. The search query generator apparatus according to claim 1, wherein the computing device further includes:
a query generator unit to generate a search query by mapping on a vector space the task feature information extracted by the task feature information extraction unit.

12. The search query generator apparatus according to claim currently amended 1, wherein the computing device further includes:
a query generator unit to create a weight by combining the frequency of the task feature information and/or the number of documents that include the task feature information based on the task feature information extracted by the task feature information extraction unit; and
the query generator unit to determine the task feature information used for the search query generation in according to the weight.

13. A search query generation method performed by a computing device including a processor and an information manipulation database, comprising:
storing information of a first manipulation subject of a first information manipulation performed by a user with a computer in a memory;
detecting, with the computing device, a second information manipulation that the user has performed with the computer by monitoring the second information manipulation in the computer performed by the user;
accumulating information of a second manipulation subject of the second information manipulation in the information manipulation database;
judging whether the second manipulation subject accumulated in the information manipulation database corresponds to the first manipulation subject stored in the memory;
mapping the first manipulation subject and the second manipulation subject in a vector space to obtain a first manipulation subject vector and a second manipulation subject vector when the second manipulation subject does not correspond to the first manipulation subject;
obtaining similarity between the first manipulation subject vector and the second manipulation subject vector;
adding the information of the second manipulation subject to the memory when the similarity is higher than a threshold;
detecting, with the computing device, a plurality of information manipulations as a user task by detecting the first and second manipulation subjects stored in the memory as manipulation subjects handled in the user task; and
detecting that the user has started another user task for handling the second manipulation subject when the similarity is lower than the threshold,
wherein the computing further includes: a task feature information extraction to identify a set of information handled in the task from the task detected by the task detection unit and to extract task feature information characterizing the task from the set of information,
wherein the task detecting detects a user task by separating information manipulations into certain time intervals.

14. The search query generation method according to claim 13, further comprising:
generating, with the computing device, a search query by combining the extracted task feature information.

15. A non-transitory computer-readable recording medium recording a search query generation program, wherein the search query generation program causes a computing device to perform:
storing information of a first manipulation subject of a first information manipulation performed by a user with a computer in a memory;
detecting a second information manipulation that the user has performed with the computer by monitoring the second information manipulation in the computer performed by the user;
accumulating information of a second manipulation subject of the second information manipulation in the information manipulation database;
judging whether the second manipulation subject accumulated in the information manipulation database corresponds to the first manipulation subject stored in the memory;
mapping the first manipulation subject and the second manipulation subject in a vector space to obtain a first manipulation subject vector and a second manipulation subject vector when the second manipulation subject does not correspond to the first manipulation subject;

obtaining similarity between the first manipulation subject vector and the second manipulation subject vector;

adding the information of the second manipulation subject to the memory when the similarity is higher than a threshold;

detecting a plurality of information manipulations as a user task by detecting the first and second manipulation subjects stored in the memory as manipulation subjects handled in the user task; and detecting that the user has started another user task for handling the second manipulation subject when the similarity is lower than the threshold, wherein the computing further includes: a task feature information extraction to identify a set of information handled in the task from the task detected by the task detection unit and to extract task feature information characterizing the task from the set of information, wherein the task detecting detects a user task by separating information manipulations into certain time intervals.

16. The non-transitory recording medium according to claim 15, wherein the search query generation program further causes a computing device to perform: generating a search query by combining the extracted task feature information.

* * * * *

UNITED STATES PATENT AND TRADEMARK OFFICE
CERTIFICATE OF CORRECTION

PATENT NO. : 8,595,229 B2  
APPLICATION NO. : 11/564412  
DATED : November 26, 2013  
INVENTOR(S) : Akira Karasudani et al.

Page 1 of 1

It is certified that error appears in the above-identified patent and that said Letters Patent is hereby corrected as shown below:

In the Claims

In Column 19, Line 58, In Claim 12, delete "claim currently ammended 1," and insert -- claim 1, --, therefor.

Signed and Sealed this  
First Day of April, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,595,229 B2  
APPLICATION NO. : 11/564412  
DATED : November 26, 2013  
INVENTOR(S) : Karasudani et al.

Page 1 of 1

It is certified that error appears in the above-identified patent and that said Letters Patent is hereby corrected as shown below:

In the Claims

In Column 20, Line 25, In Claim 13, delete "computing" and insert -- method --, therefor.
In Column 20, Lines 37-38, In Claim 13, delete "task detection unit" and insert
-- detecting the user task --, therefor.
In Column 20, Line 40, In Claim 13, delete "task detecting" and insert -- detecting the user task --, therefor.
In Column 20, Line 49, In Claim 15, delete "perform:" and insert -- perform a process comprising: --, therefor.
In Column 21, Line 15, In Claim 15, delete "computing" and insert -- process --, therefor.
In Column 21, Lines 17-18, In Claim 15, delete "task detection unit" and insert
-- detecting the user task --, therefor.
In Column 21, Line 20, In Claim 15, delete "task detecting" and insert -- detecting the user task --, therefor.

Signed and Sealed this
Seventeenth Day of February, 2015

Michelle K. Lee
*Deputy Director of the United States Patent and Trademark Office*